US007242716B2

(12) United States Patent
Koto et al.

(10) Patent No.: US 7,242,716 B2
(45) Date of Patent: Jul. 10, 2007

(54) VIDEO ENCODING METHOD AND APPARATUS AND VIDEO DECODING METHOD AND APPARATUS

(75) Inventors: Shinichiro Koto, Machida (JP);
Takeshi Chujoh, Tokyo (JP); Yoshihiro Kikuchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 839 days.

(21) Appl. No.: 10/409,068

(22) Filed: Apr. 9, 2003

(65) Prior Publication Data

US 2003/0215014 A1    Nov. 20, 2003

(30) Foreign Application Priority Data

Apr. 10, 2002   (JP)   ............................. 2002-108102
Nov. 25, 2002   (JP)   ............................. 2002-341239

(51) Int. Cl.
*H04N 7/12*   (2006.01)
*G06K 9/36*   (2006.01)

(52) U.S. Cl. .................................. 375/240.16; 382/236

(58) Field of Classification Search ............ 375/240.04, 375/240.12–240.16, 240.24, 240.25; 348/402.1; 380/200; 382/236; H04N 7/12
See application file for complete search history.

(56) References Cited

U.S. PATENT DOCUMENTS

| 5,317,397 | A | | 5/1994 | Odaka et al. | |
|---|---|---|---|---|---|
| 5,412,430 | A | * | 5/1995 | Nagata | ..................... 348/402.1 |
| 5,424,779 | A | | 6/1995 | Odaka et al. | |
| 5,467,136 | A | | 11/1995 | Odaka et al. | |
| 5,742,344 | A | | 4/1998 | Odaka et al. | |
| 6,016,162 | A | * | 1/2000 | Odaka et al. | ........... 375/240.04 |
| 6,266,370 | B1 | | 7/2001 | Kamikura et al. | |
| 6,459,733 | B1 | * | 10/2002 | Yokoyama et al. | ..... 375/240.12 |
| 2003/0215014 | A1 | | 11/2003 | Koto et al. | |
| 2004/0057515 | A1 | * | 3/2004 | Koto et al. | ............. 375/240.14 |
| 2004/0057523 | A1 | * | 3/2004 | Koto et al. | ............. 375/240.12 |
| 2004/0141615 | A1 | * | 7/2004 | Chujoh et al. | .............. 380/200 |
| 2004/0258156 | A1 | * | 12/2004 | Chujoh et al. | ......... 375/240.16 |

FOREIGN PATENT DOCUMENTS

JP         5-37915         2/1993

(Continued)

OTHER PUBLICATIONS

T. Wiegand, Library of Congress, Multi-Frame Motion-Compensated Prediction, pp. 14-17, "State-Of-The-Art Video Transmission", 2001.

(Continued)

*Primary Examiner*—Gims Philippe
(74) *Attorney, Agent, or Firm*—Oblon, Spivak, McClelland, Maier & Neustadt, P.C.

(57) ABSTRACT

A video encoding method includes extracting at least one reference macroblock from each of a plurality of reference frames to generate a plurality of reference macroblocks, computing a linear sum of the reference macroblocks using weighting factors to generate a predictive macroblock, generating a motion vector between the video macroblock and the reference macroblock corresponding to the predictive macroblock, generating a prediction error signal between the predictive macroblock and the video macroblock, and encoding the prediction error signal, a first index indicating the plurality of reference frames, a second index indicating the weighting factors and the motion vector.

2 Claims, 14 Drawing Sheets

FOREIGN PATENT DOCUMENTS

| | | |
|---|---|---|
| JP | 5-41861 | 2/1993 |
| JP | 6-350995 | 12/1994 |
| JP | 9-163376 | 6/1997 |
| JP | 10-224795 | 8/1998 |
| JP | 11-239351 | 8/1999 |
| JP | 3166716 | 3/2001 |

OTHER PUBLICATIONS

U.S. Appl. No. 11/535,796, filed Sep. 27, 2006, Koto et al.
U.S. Appl. No. 11/535,856, filed Sep. 27, 2006, Koto et al.
U.S. Appl. No. 11/527,471, filed Sep. 27, 2006, Koto et al.
U.S. Appl. No. 11/527,469, filed Sep. 27, 2006, Koto et al.
U.S. Appl. No. 11/527,470, filed Sep. 27, 2006, Koto et al.
U.S. Appl. No. 11/527,557, filed Sep. 27, 2006, Koto et al.
U.S. Appl. No. 11/535,922, filed Sep. 27, 2006, Koto et al.
U.S. Appl. No. 11/535,906, filed Sep. 27, 2006, Koto et al
U.S. Appl. No. 11/535,862, filed Sep. 27, 2006, Koto et al.
U.S. Appl. No. 11/535,908, filed Sep. 27, 2006, Koto et al.
U.S. Appl. No. 11/527,702, filed Sep. 27, 2006, Koto et al.
U.S. Appl. No. 11/535,821, filed Sep. 27, 2006, Koto et al.
U.S. Appl. No. 11/535,894, filed Sep. 27, 2006, Koto et al.
U.S. Appl. No. 11/527,612, filed Sep. 27, 2006, Koto et al..

* cited by examiner

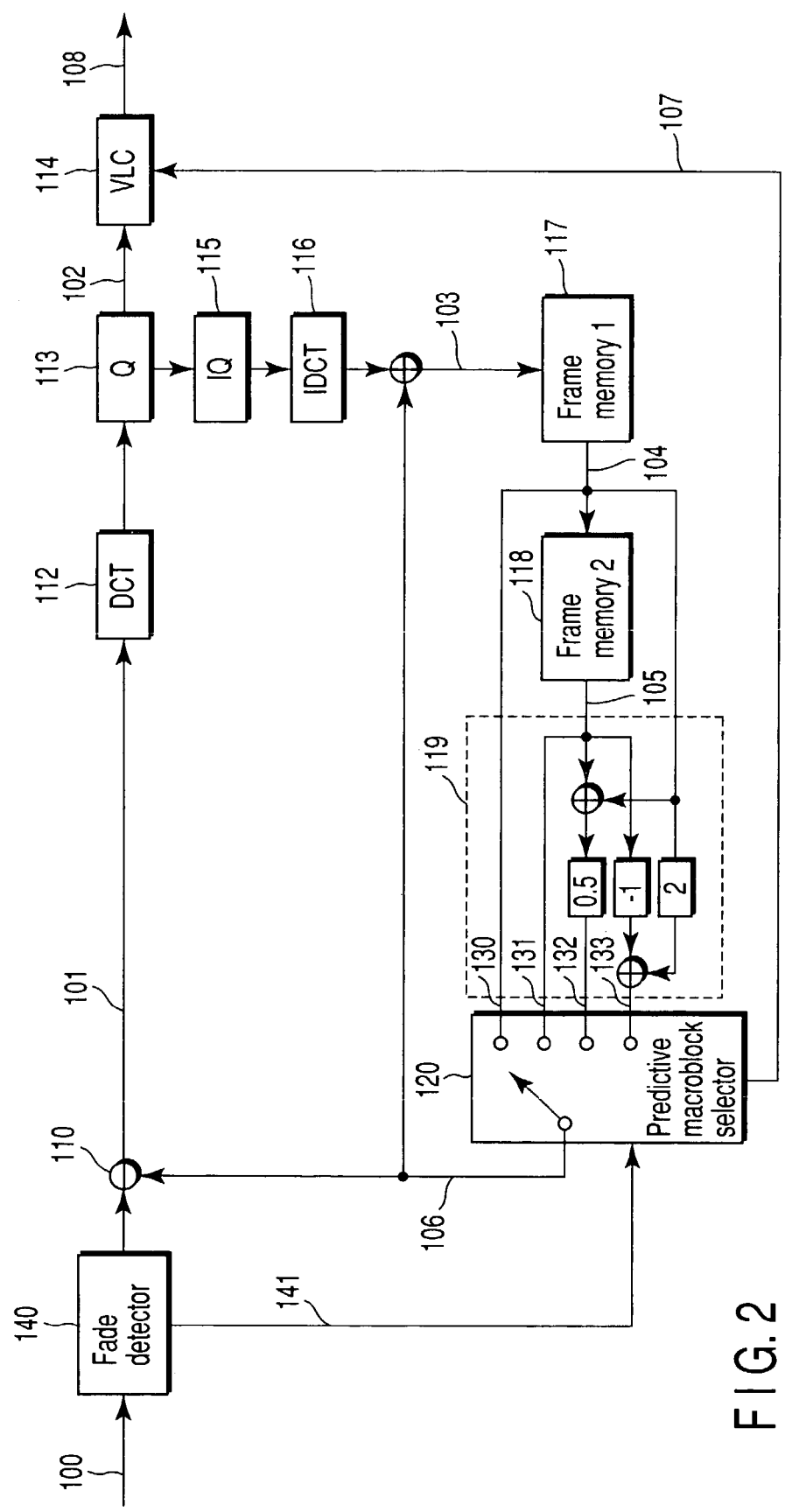
F I G. 2

| Code_number | Weighting_factors ||
|---|---|---|
| | near | far |
| 0 | 0.5 | 0.5 |
| 1 | 2 | -1 |

| Code_number | Weighting_type |
|---|---|
| 0 | average |
| 1 | interpolative / extrapolative |

| Code_number | Reference_frame |
|---|---|
| 0 | The last decoded frame (1 frame back) |
| 1 | 2 frames back |
| 2 | Combination of 1 frame back with 2 frames back |

```
Number_Of_Max_References
WeightingFactorDenominatorExponent
for(i=1; i<=Number_Of_Max_References; i++)
    WeightingFactorNumerator [ i ]
```
FIG. 10
| Code_number | Reference_frame |
|---|---|
| 0 | Multi-reference prediction |
| 1 | The last decoded frame (1 frame back) |
| 2 | 2 frames back |
| 3 | 3 frames back |
| ... | ... |
FIG. 11
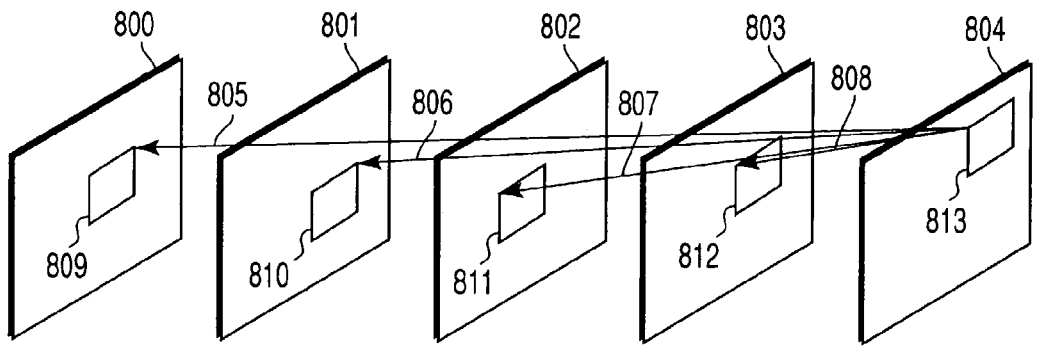
FIG. 12
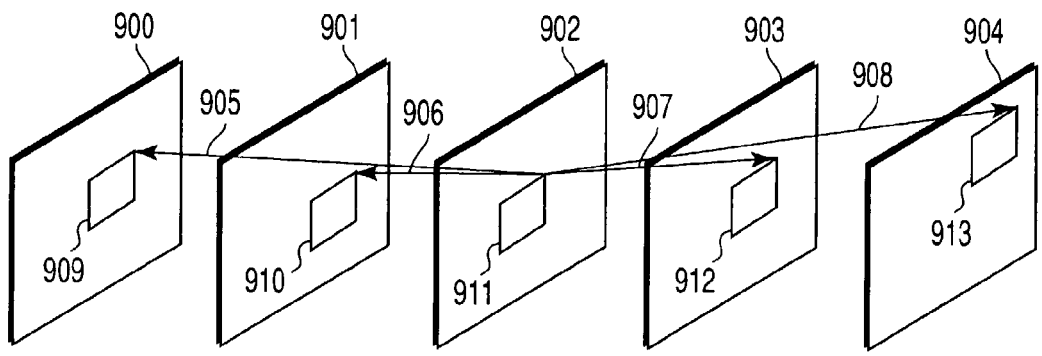
FIG. 13

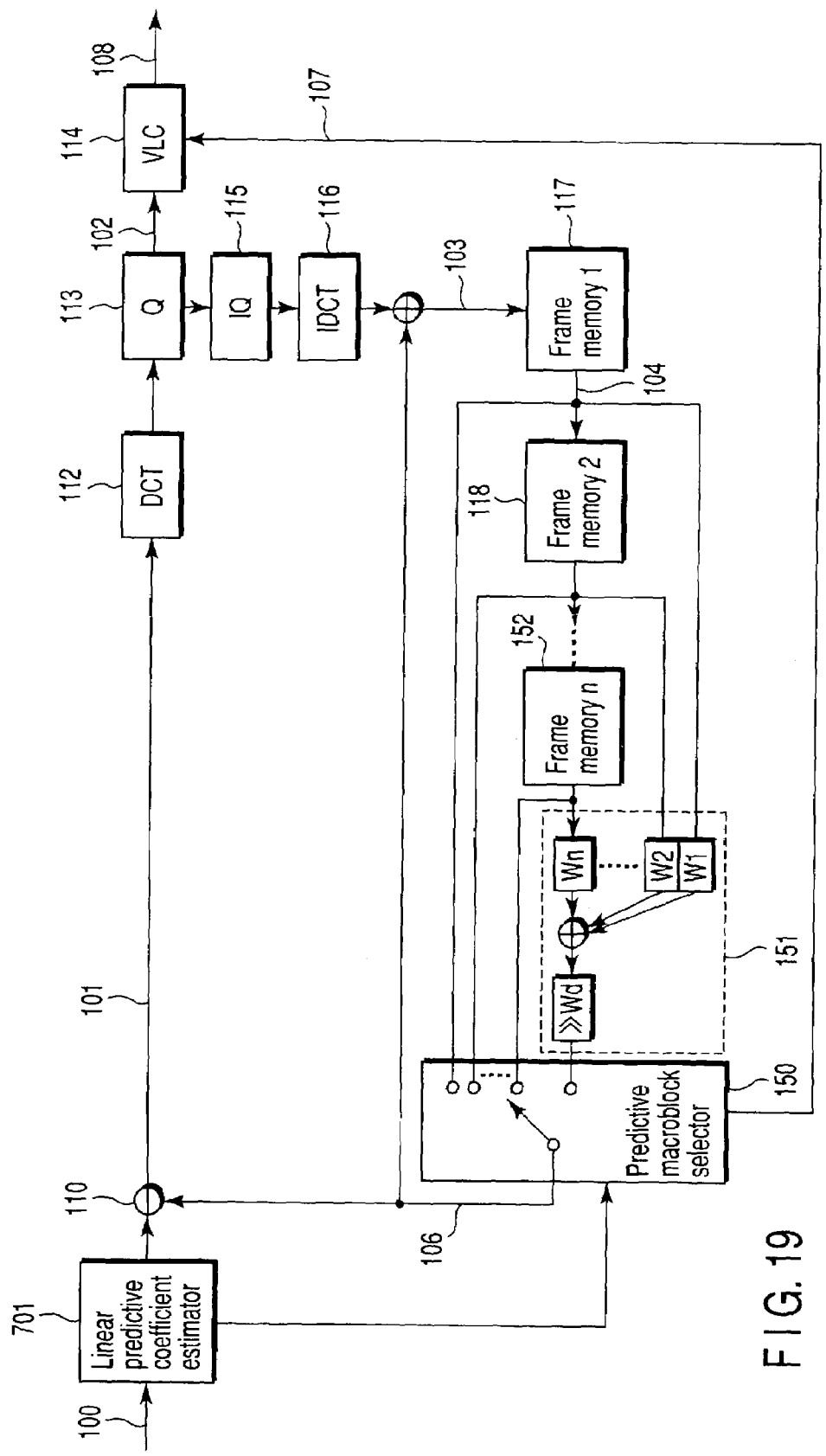
F I G. 19

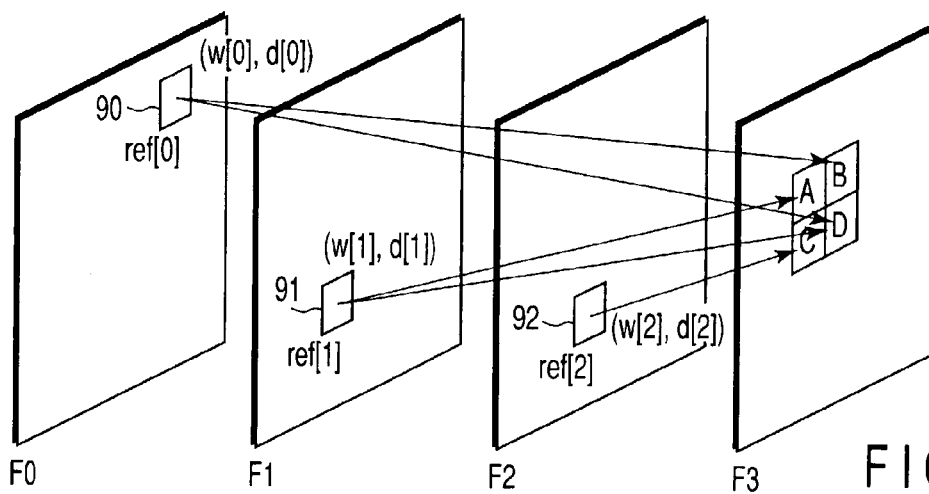
F I G. 34
```
picture(or slice)_header( )
{
  . . .
  number_of_max_ref_idx
  . . .
  weighting_table( )
}
```
F I G. 35
```
weighting_table( )
{
  w_exponential_denominator
  for(i=0; i<number_of_max_ref_idx; i++)
  {
    w_numerator[i]
    d[i]
  }
}
```
F I G. 36
```
weighting_table( )
{
  w_exponential_denominator
  for(i=0; i<number_of_max_ref_idx; i++)
  {
    w_numerator[i]
    d[i]
  }
}
```
F I G. 37

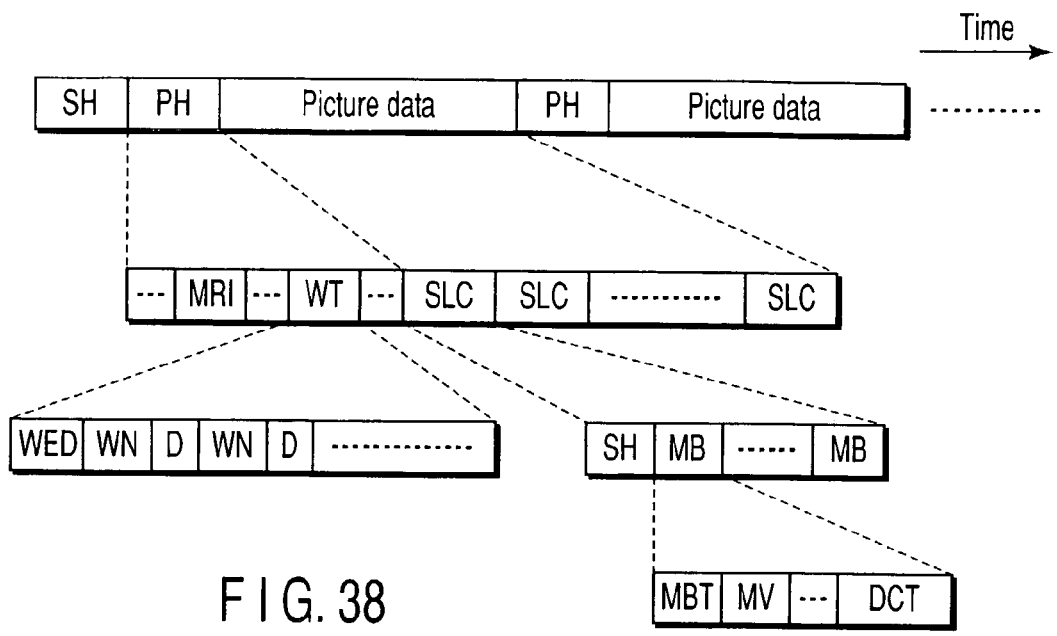
F I G. 38
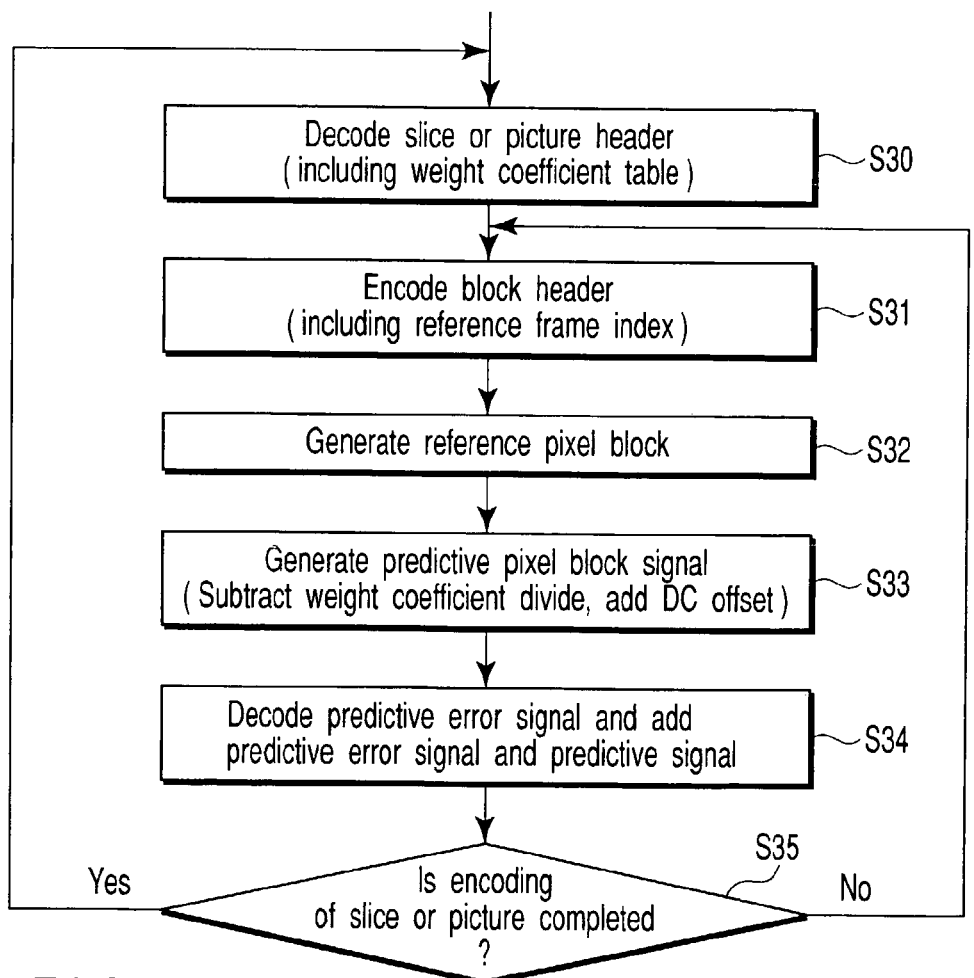
F I G. 39

VIDEO ENCODING METHOD AND APPARATUS AND VIDEO DECODING METHOD AND APPARATUS

CROSS-REFERENCE TO RELATED APPLICATIONS

This application is based upon and claims the benefit of priority from the prior Japanese Patent Applications No. 2002-108102, filed Apr. 10, 2002; and No. 2002-341239, filed Nov. 25, 2002, the entire contents of both of which are incorporated herein by reference.

BACKGROUND OF THE INVENTION

1. Field of the Invention

The present invention relates to a video encoding method and apparatus and a video decoding method and apparatus which use a motion compensation predictive inter-frame encoding.

2. Description of the Related Art

As video compression encoding techniques, MPEG-1 (ISO/IEC11172-2), MPEG-2 (ISO/IEC13818-2), MPEG-4 (ISO/IEC14496-2), and the like have been widely used. In these video encoding schemes, encoding is performed by a combination of intra-frame encoding, forward predictive inter-frame encoding, and bi-directional predictive encoding. Frames encoded in these encoding modes are called I, P, and B pictures, respectively. The P picture is encoded by using the immediately preceding P or I picture as a reference frame. The B picture is encoded by using the immediately preceding and succeeding P or I pictures as reference frames. Forward predictive inter-frame encoding and bi-directional predictive encoding are called motion compensation predictive inter-frame encoding.

In video encoding based on an MPEG scheme, a prediction picture can be selectively generated for each macroblock from one or more video frames. In the case of P pictures, a prediction picture is generally generated on a macroblock basis from one reference frame. In the case of B pictures, either a prediction picture is generated from one of a forward reference frame and a backward reference frame, or a prediction picture is generated from the average value of reference macroblocks extracted from both a forward reference frame and a backward reference frame. The information of these prediction modes is embedded in encoded data for each macroblock.

In such motion compensation predictive inter-frame encoding, when the same picture moves temporally and horizontally between frames in an area equal to or larger than the size of each macroblock, a good prediction result can be obtained. With regard to temporal enlargement/reduction and rotation of pictures or temporal variations in signal amplitude such as fade-in and fade-out, however, high prediction efficiency cannot always be obtained. In encoding at a constant bit rate, if such pictures from which high prediction efficiency cannot be obtained are input, a great deterioration in picture quality may occur. In encoding at a variable bit rate, a large code amount is consumed for pictures with poor prediction efficiency to suppress deterioration in picture quality, resulting in an increase in total code amount.

Temporal enlargement/reduction, rotation, and fade-in/fade-out of pictures can be approximated by affine transformation of video signals. Predictions using affine transformation will therefore greatly improve prediction efficiency. In order to estimate a parameter for affine transformation, an enormous amount of parameter estimation computation is required at the time of encoding. More specifically, a reference picture must be transformed by using a plurality of transformation parameters, and one of the parameters that exhibits the minimum prediction residual error must be determined. This requires an enormous amount of transformation computation. This leads to an enormous amount of encoding computation or an enormous increase in hardware cost and the like. In addition, a transformation parameter itself must be encoded as well as a prediction residual error, and hence the encoded data becomes enormous. In addition, inverse affine transformation is required at the time of decoding, resulting in a great amount of decoding computation or a very high hardware cost.

As described above, in the conventional video encoding methods such as MPEGs, sufficient prediction efficiency cannot be obtained with respect to temporal changes in video other than translations. In addition, in the video encoding and decoding method using affine transformation, although prediction efficiency itself can be improved, the overhead for encoded data increases and the encoding and decoding costs greatly increase.

It is an object of the present invention to suppress increases in computation amount and the overhead for predictive picture encoded data, while greatly improving prediction efficiency, in video encoding and decoding, particularly for fading pictures, which has to date been a weak point in conventional video encoding methods such as MPEG.

BRIEF SUMMARY OF THE INVENTION

According to an aspect of the invention, there is provided A video encoding method of performing a motion compensated prediction interframe encoding on a video macroblock, the method comprising: extracting at least one reference macroblock from each of the plurality of reference frames to generate a plurality of reference macroblocks;

calculating a linear sum of the reference macroblocks using weighting factors to generate a predictive macroblock;

generating a motion vector between the video macroblock and the reference macroblock corresponding to the predictive macroblock; generating a prediction error signal between the predictive macroblock and the video macroblock; and encoding the prediction error signal, a first index indicating the plurality of reference frames, a second index indicating the weighting factors and the motion vector.

BRIEF DESCRIPTION OF THE SEVERAL VIEWS OF THE DRAWING

FIG. 2 is a block diagram showing the arrangement of a video encoding apparatus according to the second embodiment of the present invention;

FIG. 10 is a view showing an example of a syntax indicating linear predictive coefficients according to the embodiment of the present invention;

FIG. 11 is a view showing an example of a table showing reference frames according to the embodiment of the present invention;

FIG. 12 is a view showing an inter-frame prediction relationship according to the embodiment of the present invention;

FIG. 13 is a view showing an inter-frame prediction relationship according to the embodiment of the present invention;

FIG. 19 is a block diagram showing the arrangement of a video encoding apparatus according to the fourth embodiment of the present invention;

FIG. 34 is a view for explaining a weighting prediction according to the embodiment of the present invention;

FIG. 35 is a view showing the data structure of a picture header or slice header according to the embodiment of the present invention;

FIG. 36 is a view showing the first example of the data structure of a weighting prediction coefficient table according to the embodiment of the present invention;

FIG. 37 is a view showing the second example of the data structure of a weighting prediction coefficient table according to the embodiment of the present invention;

FIG. 38 is a view showing the data structure of to-be-encoded video data according to the embodiment of the present invention; and FIG. 39 is a flow chart showing a procedure for video decoding according to the present invention of the present invention.

DETAILED DESCRIPTION OF THE INVENTION

First Embodiment

Figure 1:
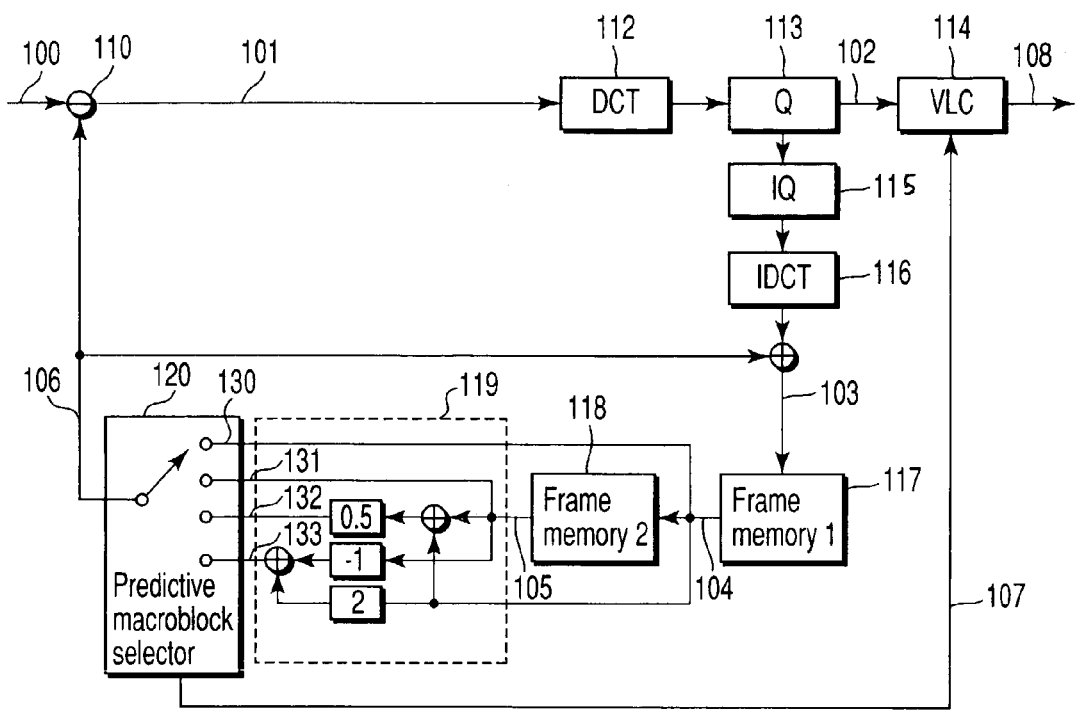
FIG. 1 is a block diagram showing the arrangement of a video encoding apparatus according to the first embodiment of the present invention.

FIG. 1 shows the arrangement of a video encoding apparatus according to the first embodiment of the present invention. The video encoding apparatus shown in FIG. 1 may be implemented by hardware or software using a computer. Part of the processing performed by the apparatus may be implemented by hardware, while the remaining part may be implemented by software. This equally applies to video encoding apparatuses according to the other embodiments to be described later.

Referring to FIG. 1, a predictive macroblock generator 119 generates predictive macroblock signals 130 to 133 for a video signal (to-be-encoded frame) 100 input for every frame from the encoded frames stored in a first reference frame memory 117 and second reference frame memory 118. A predictive macroblock selector 120 selects an optimal predictive macroblock signal from the predictive macroblock signals 130 to 133, and generates a prediction picture signal 106 by using the selected predictive macroblock signal.

The prediction picture signal 106 is input to a subtracter 110, which in turn generates a prediction error signal 101 indicating an error in the prediction picture signal 106 with respect to the input video signal 100. DCT transformer 112 performs a discrete cosine transform of the prediction error signal 101. The resultant DCT coefficient data is quantized by a quantizer 113 to generate quantized DCT coefficient data 102. The quantized DCT coefficient data 102 is branched into two paths. The data in one path is encoded by a variable length encoder 114.

In the other path, the quantized DCT coefficient data 102 is reconstructed as a prediction error signal through a dequantizer 115 and inverse DCT transformer 116. This reconstructed prediction error signal is added to the prediction picture signal 106 to generate a local decoded picture signal 103. The local decoded picture signal 103 is input to the first reference frame memory 117. The local decoded picture signal 103 is stored as a reference frame in the first reference frame memory 117. The local decoded picture signal 103 is a decoded picture signal of the frame encoded immediately before the current video frame that is the input video signal 100. The second reference frame memory 118 is connected to the output of the first reference frame memory 117. A local decoded picture signal of the frame encoded immediately before the current encoded frame is stored as a reference frame in the second reference frame memory 118.

The predictive macroblock generator 119 generates the predictive macroblock signal 130 from only a reference macroblock signal 104 extracted from the reference frame stored in the first reference frame memory 117. The predictive macroblock signal 131 is generated from only a reference macroblock signal 105 extracted from the reference frame stored in the second reference frame memory 118. The predictive macroblock signal 132 is generated by averaging the reference macroblock signals 104 and 105 respectively extracted from the first and second reference frame memories 117 and 118. The predictive macroblock signal 133 is generated by subtracting the reference macroblock signal 105 extracted from the second reference frame memory 118 from the signal obtained by doubling the amplitude of the reference macroblock signal 104 extracted from the first reference frame memory 117.

The predictive macroblock selector 120 calculates the difference between each of the predictive macroblock signals 130 to 133 generated by the predictive macroblock generator 119 and the video macroblock signal extracted from the input video signal 100, and selects one of the predictive macroblock signals which exhibits a minimum error for each video macroblock.

The predictive macroblock selector 120 also outputs the position of the selected predictive macroblock signal relative to the video macroblock signal, as motion vector information, for each video macroblock. In addition, the predictive macroblock selector 120 outputs the generation method for the selected predictive macroblock signal (the generation method for each of the predictive macroblock signals 130 to 133) as prediction mode information. The prediction mode information will be described in detail later. The prediction picture signal 106 is generated by the application of such a motion vector and prediction mode, and the prediction error signal 101 is generated on the basis of the prediction picture signal 106.

When the signal component of the input video signal 100 is formed from a luminance signal and two chrominance signals, the predictive macroblock selector 120 applies the same motion vector and prediction mode to the signal components of the respective macroblocks.

The prediction error signal 101 is transformed into the quantized DCT coefficient data 102 through the DCT transformer 112 and quantizer 113. The predictive macroblock selector 120 outputs side information 107 containing motion vector information and prediction mode information. The variable length encoder 114 encodes the quantized DCT coefficient data 102 and side information 107 and outputs the resultant data as encoded data 108. The encoded data 108 is sent out to a storage system or transmission system (not shown).

In this embodiment, the prediction error signal 101 is encoded through the DCT transformer 112, quantizer 113, and variable length encoder 114. However, the prediction error signal 101 may be subjected to a wavelet transform instead of a DCT, or may be subjected to arithmetic encoding instead of variable length encoding.

Second Embodiment

FIG. 2 shows the arrangement of a video encoding apparatus according to the second embodiment of the present invention. In this embodiment, a fade detector 140 for an input video signal 100 is added to the video encoding apparatus according to the first macroblock shown in FIG. 1. The fade detector 140 calculates an average luminance signal for each frame of the input video signal 100. If a change in luminance over time has a predetermined slope, the fade detector 140 determines that the picture represented by the input video signal 100 is a fading picture, and notifies a predictive macroblock selector 120 of the determination result as a fade detection signal 141.

If the fade detector 140 determines that the picture represented by the input video signal 100 is a fading picture, the predictive macroblock selector 120 limits a prediction mode to a prediction from one reference frame or a prediction based on linear extrapolation or linear interpolation of a plurality of reference frames, and determines an optimal motion vector and prediction mode for each macroblock. The first flag indicating the determined motion vector and prediction mode is written in the header of a macroblock, and a prediction error signal 101 is encoded. Meanwhile, the second flag indicating a prediction mode combination is written in the header data of the frame.

If the fade detector 140 determines that the picture represented by the input video signal 100 is not a fading picture, the predictive macroblock selector 120 limits a prediction mode to a prediction from one reference frame or a prediction based on the average value of a plurality of reference frames, and determines an optimal motion vector and prediction mode in the same manner. The motion vector, prediction mode, and prediction error signal 101 are encoded.

When encoded data 108 output from the video encoding apparatus in FIG. 2 is received and decoded, a prediction mode is determined for each macroblock from the first and second flags indicating a prediction mode. A predictive macroblock signal is generated from the motion vector and the determined prediction mode which are sent for each macroblock. The encoded prediction error signal is decoded and added to a prediction signal to generate a decoded signal.

This arrangement makes it possible to reduce the encoding overhead for prediction mode information.

Figure 3:
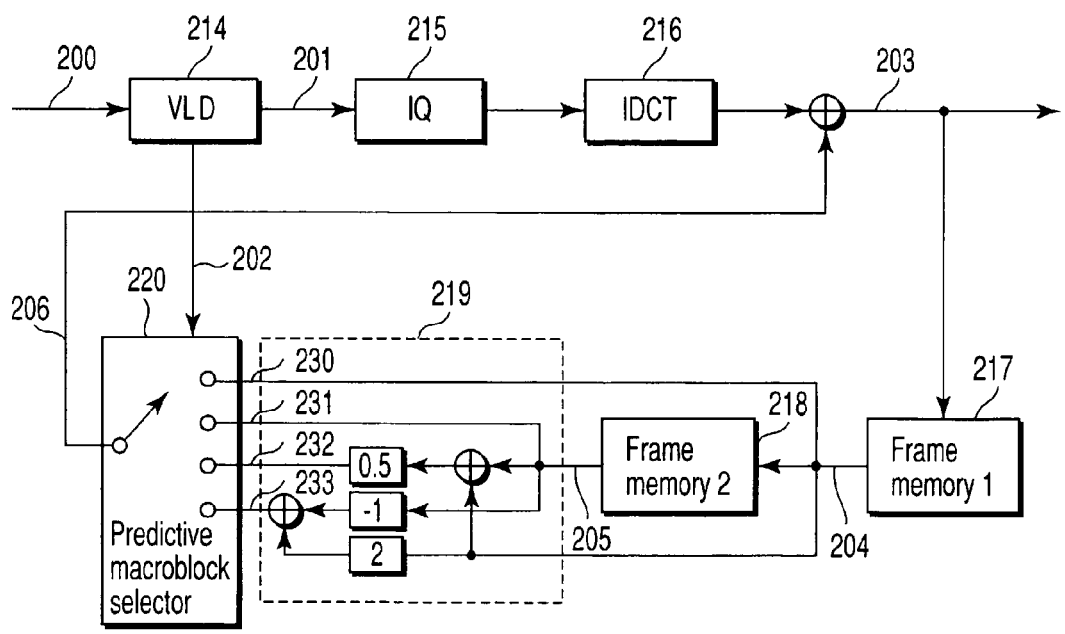
FIG. 3 is a block diagram showing the arrangement of a video decoding apparatus according to the first and second embodiments of the present invention.

FIG. 3 shows the arrangement of a video decoding apparatus according to the first and second embodiments of the present invention. The video decoding apparatus shown in FIG. 3 may be implemented by hardware or software using a computer. Part of the processing performed by the apparatus may be implemented by hardware, while the remaining part my be implemented by software. This equally applies to video decoding apparatuses according to the other embodiments to be described later.

The arrangement of the video decoding apparatus according to this embodiment corresponds to that of the video encoding apparatus shown in FIG. 1 or 2. Encoded data 108 output from the video encoding apparatus shown in FIG. 1 or 2 is input as encoded data 200 to the video decoding apparatus in FIG. 3 through a transmission system or storage system.

First of all, a variable length code decoder 214 decodes the encoded data 200 input to the video decoding apparatus to extract quantized DCT coefficient data 201 and side information 202 containing motion vector information and prediction mode information. The quantized DCT coefficient data 201 is decoded through a dequantizer 215 and inverse DCT transformer 216 to reconstruct a prediction error signal. The prediction error signal is added to a prediction picture signal 206 to generate a decoded picture signal 203.

The decoded picture signal 203 of the frame decoded immediately before the current video frame that is the encoded data 200 is stored as a reference frame in a first reference frame memory 217. A decoded picture signal of the frame decoded immediately before the decoded picture signal 203 is stored as a reference frame in a second reference frame memory 218 connected to the output of the first reference frame memory 217.

A predictive macroblock generator 219 generates the first predictive macroblock signal from only a reference macroblock extracted from the reference frame stored in the first reference frame memory 217. The second predictive macroblock signal is generated from only a reference macroblock signal extracted from the reference frame stored in the second reference frame memory 218. The third predictive macroblock signal is generated by averaging the reference macroblock signals respectively extracted from the first and second reference frame memories 217 and 218. The fourth predictive macroblock signal is generated by subtracting the reference macroblock signal extracted from the second reference frame memory 218 from the signal obtained by doubling the amplitude of the reference macroblock signal extracted from the first reference frame memory 217. These predictive macroblock signals are input to a predictive macroblock selector 220.

The side information 202 from the variable length code decoder 214 is also input to the predictive macroblock selector 220. In accordance with the motion vector information and prediction mode information contained in the side information 202, the predictive macroblock selector 220 selects a signal identical to one of the predictive macroblock signals output from the predictive macroblock generator 219 which was used at the time of encoding. As a result, the prediction picture signal 206 is generated.

(Motion Compensation Predictive Inter-Frame Encoding)

Figures 4, 5, 6, 7:
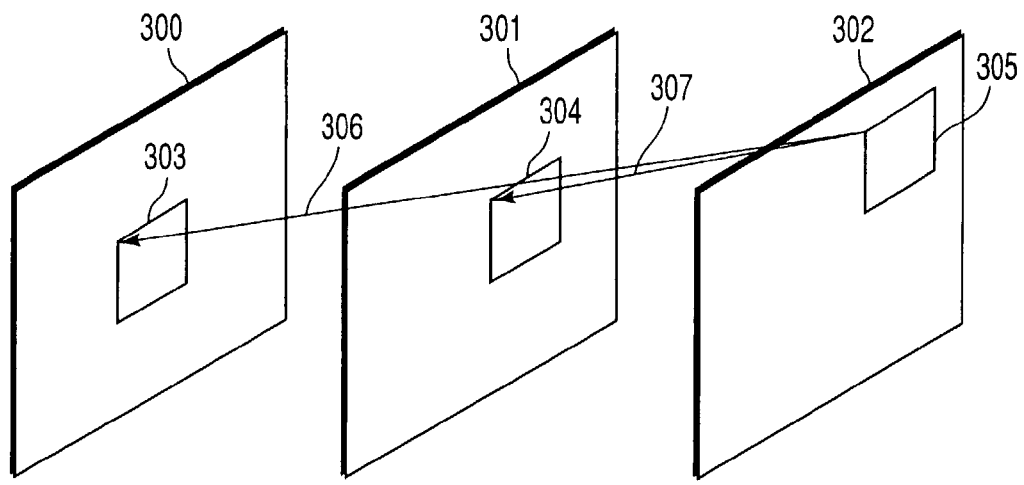
FIG. 4 is a view showing an inter-frame prediction relationship according to the embodiment of the present invention.
FIG. 5 is a view showing an example of a linear predictive coefficient table according to the embodiment of the present invention.
FIG. 6 is a view showing an example of a linear predictive coefficient table according to the embodiment of the present invention.
FIG. 7 is a view showing an example of a table showing reference frames according to the embodiment of the present invention.

FIG. 4 schematically shows an inter-frame prediction in the first and second embodiments. FIG. 4 shows a frame 302 to be encoded and decoded, an immediately preceding frame 301, and a frame 300 preceding the frame 301.

When the frame 302 is encoded or decoded, the decoded picture signal of the frame 301 is stored in the first reference frame memory 117 in FIGS. 1 and 2 or the first reference frame memory 217 in FIG. 3. The decoded picture signal of the frame 300 is stored in the second reference frame memory 118 in FIGS. 1 and 2 or the second reference frame memory 218 in FIG. 3.

A predictive macroblock is generated with respect to a video macroblock 305 to be encoded or decoded, by using one or both of a reference macroblock 303 of the reference frame 300 and a reference macroblock 304 of the reference frame 301. Motion vectors 306 and 307 are vectors indicating the positions of the reference macroblocks 303 and 304, respectively.

In an encoding operation, a search is made for an optimal motion vector and prediction mode for the video macroblock 305. In a decoding operation, a predictive macroblock signal is generated with respect to the video macroblock 305 by using the motion vector and prediction mode information contained in the side information 202.

FIGS. 5 and 6 each show an example of a predictive coefficient table used for one of the prediction modes in the first and second embodiments which is based on the linear sum of a plurality of reference frames. Predictive coefficients change on the macroblock basis in the first embodiment, and change on the frame basis in the second embodiment. There is a combination of two coefficients: "average" and "linear extrapolation".

An index (Code_number) shown in FIGS. 5 and 6 is encoded as header data for each macroblock or frame. In the second embodiment, since a linear predictive coefficient is constant for each frame, encoding may be performed by using only the header data of a frame. In the predictive coefficient table shown in FIG. 5, the numerical values of the coefficients are explicitly defined. The predictive coefficient table shown in FIG. 6 indicates "average" or "linear prediction (interpolation or extrapolation)". By encoding such indexes, the amount of information to be encoded can be reduced, and hence the encoding overhead can be reduced as compared with the case wherein linear predictive coefficients are directly encoded.

FIG. 7 is a table indicating a combination of reference frames (Reference_frame) associated with various prediction modes in the first and second embodiments of the present invention. Referring to FIG. 7, Code_number=0 indicates a combination of reference frames in a prediction mode from an immediately preceding frame (one frame back); Code_number=1, in a prediction mode two frames back; and Code_number=2, in a prediction mode based on the linear sum of frames one frame backs and two frames back. In the case of Code_number=2, the prediction mode using the above linear predictive coefficients is used.

In the first and second embodiments, the combinations of reference frames can be changed on a macroblock basis, and the indexes in the table in FIG. 7 are encoded on a macroblock basis.

Third Embodiment

Figure 8:
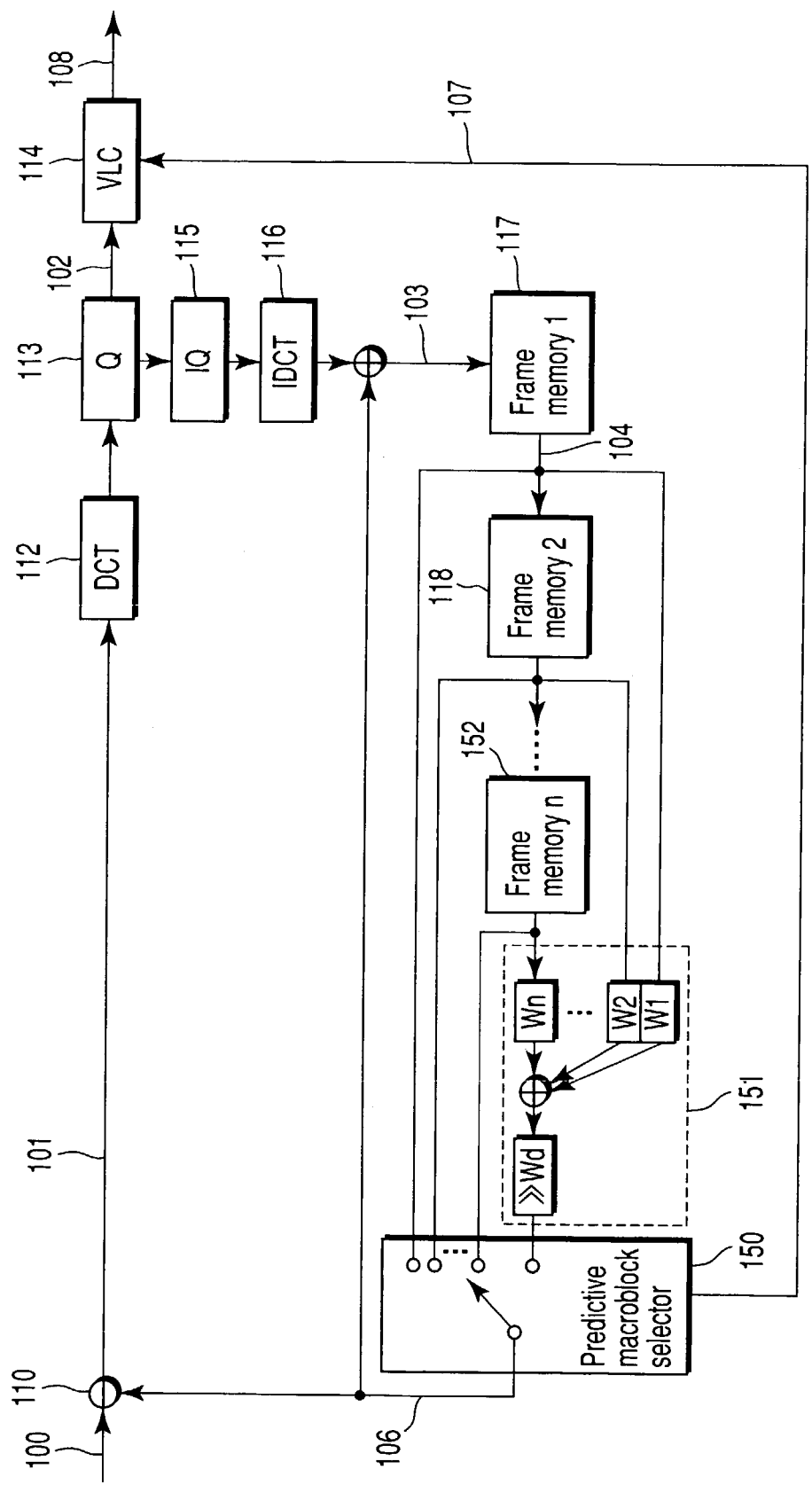
FIG. 8 is a block diagram showing the arrangement of a video encoding apparatus according to the third embodiment of the present invention.
Figure 9:
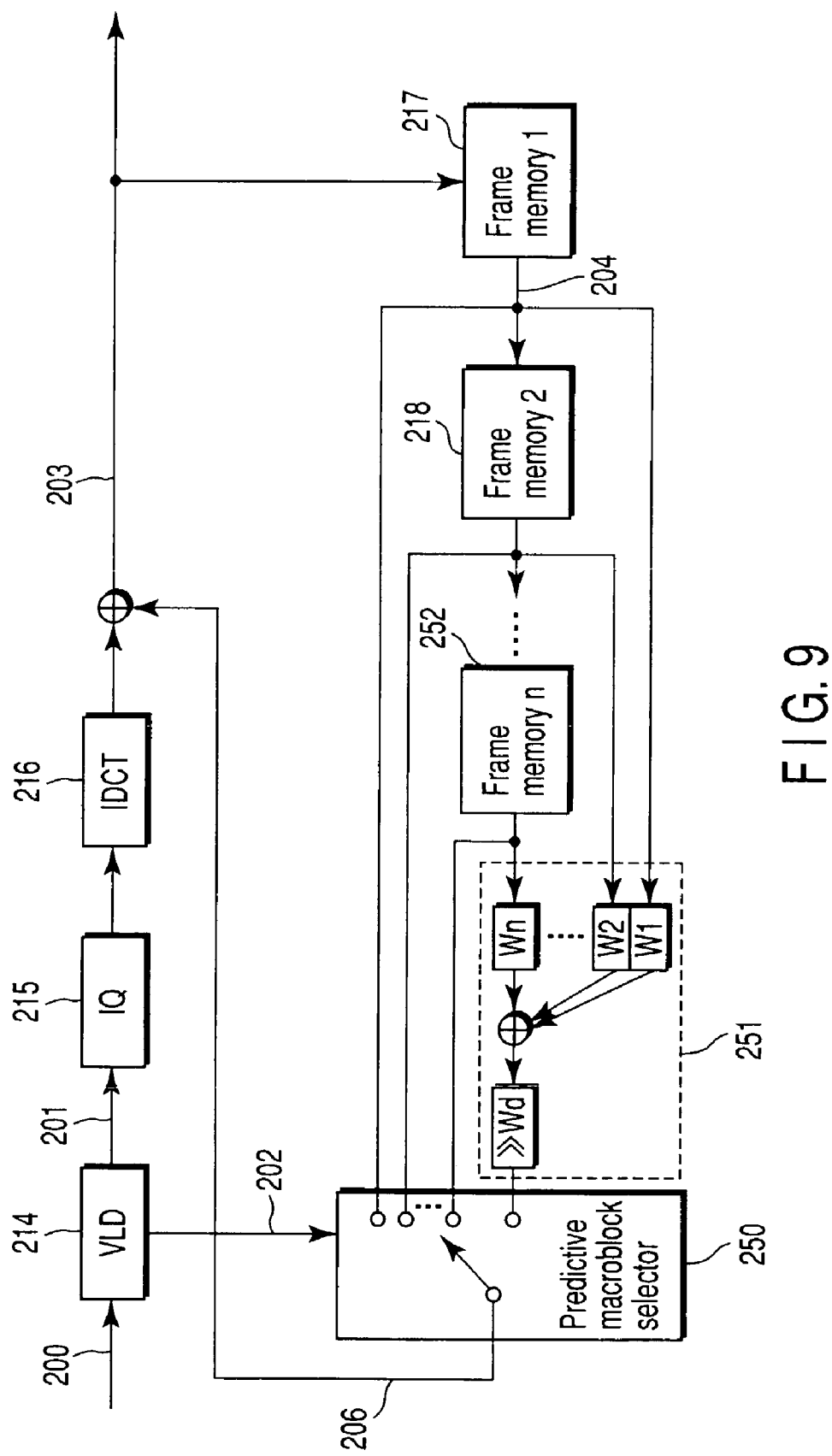
FIG. 9 is a block diagram showing the arrangement of a video decoding apparatus according to the third embodiment of the present invention.

FIGS. 8 and 9 show the arrangements of a video encoding apparatus and video decoding apparatus according to the third embodiment of the present invention. In the first and second embodiments, a prediction is performed on the basis of the linear sum of a maximum of two reference frames. In contrast to this, the third embodiment can perform a prediction based on selection of one specific frame for each macroblock by using three or more reference frames or the linear sum of a plurality of reference frames.

The video encoding apparatus shown in FIG. 8 includes reference frame memories 117, 118, and 152 corresponding to the maximum reference frame count (n). Likewise, the video decoding apparatus in FIG. 9 includes reference frame memories 217, 218, and 252 corresponding to the maximum reference frame count (n). In this embodiment, in a prediction based on a linear sum, each of predictive macroblock generators 151 and 251 generates a prediction picture signal by computing the sum of the products of predictive coefficients W1 to Wn and reference macroblocks extracted from the respective reference frames and shifting the result to the right by Wd bits. The reference frames to be selected can be changed for each macroblock, and the linear predictive coefficients can be changed for each frame. A combination of linear predictive coefficients is encoded as header data for a frame, and the selection information of reference frames is encoded as header data for each macroblock.

Each of predictive macroblock selectors 150 and 250 has a selection function similar to that described in the above embodiments.

FIG. 10 shows a data syntax for encoding by using a linear predictive coefficient as a header for a frame according to this embodiment. In encoding linear predictive coefficients, the maximum number of reference frames is encoded first as Number_Of_Max_References. WeightingFactorDenominatorExponent (Wd in FIGS. 8 and 9) indicating the computation precision of linear predictive coefficients is then encoded. Coefficients WeightingFactorNumerator[i] (W1 to Wn in FIGS. 8 and 9) corresponding to the respective reference frames equal to Number_Of_Max_References are encoded. The linear predictive coefficient corresponding to the ith reference frame is given by $$W_i/2^{Wd} \tag{1}$$

FIG. 11 shows a table indicating a combination of reference frames to be encoded for each macroblock according to this embodiment. Code_number=0 indicates a prediction based on the linear sum of all reference frames. Code_number=1 on and after indicate that a reference frame is one specific frame and that a frame a specific number of frames back is used as a reference frame. A prediction based on the linear sum of all reference frames is performed by using the predictive coefficients shown in FIG. 10. In this case, some of the predictive coefficients are set to 0 so that a linear prediction based on a combination of arbitrary reference frames can be switched on the frame basis in the linear prediction mode.

FIGS. 12 and 13 show an inter-frame prediction using three or more reference frames according to this embodiment. FIG. 12 shows an example of using a plurality of past reference frames. FIG. 13 shows an example of using a plurality of past and future reference frames. Referring to FIG. 12, reference frames 800 to 803 are used for a video frame 804 to be encoded.

In an encoding operation, for a video macroblock 813, reference macroblocks 809 to 812 are extracted from the respective reference frames in accordance with motion vectors 805 to 808 corresponding to the respective reference frames. A predictive macroblock is then generated by a linear prediction based on the extracted reference macroblocks 809 to 812. A combination of a prediction mode and one of the reference macroblocks 809 to 812 or a motion vector exhibiting a minimum prediction error in one of prediction modes for the predictive macroblock based on the linear prediction is selected. One combination of linear predictive coefficients is determined for each video frame from a change in average luminance over time or the like. The determined combination of predictive coefficients is encoded as header data for the video frame. The motion vector of each macroblock, a prediction mode, and a prediction error signal are encoded for each macroblock.

In a decoding operation, a combination of linear predictive coefficients received for each frame is used to generate a predictive macroblock for each macroblock from a motion vector, prediction mode information, and a plurality of reference frames. Decoding is performed by adding the predictive macroblock to the prediction error signal.

Referring to FIG. 13, reference frames 900, 901, 903, and 904 are used for a video frame 902 to be encoded. In the case shown in FIG. 13, in an encoding operation and decoding operation, the reference frames 900, 901, 903, and 904 and the video frame 902 are rearranged in the order named. In the case of encoding, a plurality of local decoded picture frames are used as reference frames. In the case of decoding, a plurality of encoded frames are used as reference frames.

For a video macroblock 911 to be encoded, one of reference macroblocks 909, 910, 912, and 913 or one of the prediction signals obtained from them by linear predictions is selected on the macroblock basis and encoded, as in the case shown in FIG. 12.

Figure 14:
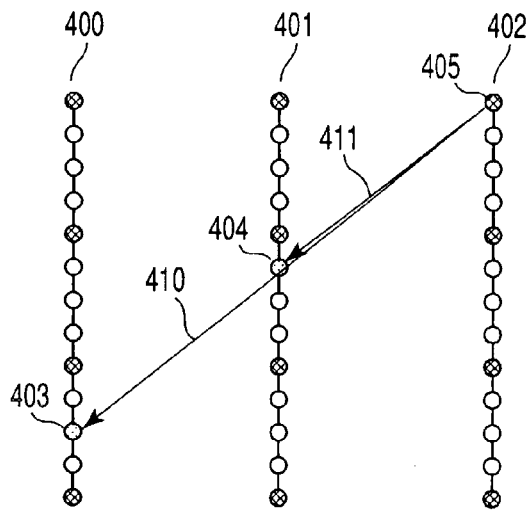
FIG. 14 is a view showing examples of motion vector information encoding and decoding methods according to the embodiment of the present invention.

FIG. 14 shows an encoding method and decoding method for motion vector information according to the embodiment of the present invention. Assume that in an inter-frame encoding operation using a plurality of reference frames as in the case shown in FIG. 4, a predictive macroblock signal is generated for each video macroblock by using a plurality of reference macroblock signals. In this case, a plurality of motion vector information items must be encoded for each macroblock. Therefore, as the number of macroblocks to be referred to increases, the overhead for motion vector information to be encoded increases. This causes a deterioration in encoding efficiency.

In the case shown in FIG. 14, reference macroblock signals are respectively extracted from two reference frames. A predictive macroblock signal is generated by using one motion vector and the motion vector obtained by scaling the motion vector in accordance with the inter-frame distance. Reference frames 401 and 400 are used for a video frame 402 to be encoded, and motion vectors 411 and 410 are detected. Referring to FIG. 14, each black point indicates a pixel position in the vertical direction, and each white point indicates an interpolated point with a precision of ¼ pixel.

FIG. 14 shows a case wherein motion compensated prediction inter-frame encoding is performed with a precision of ¼ pixel. A motion compensation pixel precision is defined for each encoding scheme as 1 pixel, ½ pixel, ⅛ pixel, or the like. In general, a motion vector is expressed by a motion compensation precision. A reference picture is generally generated by interpolating the picture data of reference frames.

Referring to FIG. 14, with regard to to-be-encoded pixel 405, a point 403 vertically separated from the top portion of the reference frame 400 by 2.5 pixels is referred to, and the motion vector 410 indicating a shift of 2.5 pixels is encoded. On the other hand, a prediction vector from the reference frame 401 with respect to the same pixel 405 is generated by scaling the encoded motion vector 410 in accordance with the inter-frame distance. In this case, a motion vector from the frame 402 with respect to the frame 401 indicates a shift of 2.5/2=1.25 pixels in consideration of the inter-frame distance. A pixel 404 in the reference frame 401 is used as a reference pixel for the pixel 405 in the video frame 402.

Since motion vectors are scaled with the same precision in encoding and decoding operations, only one motion vector needs to be encoded for each macroblock even when a video macroblock to be encoded refers to a plurality of frames. In this case, if the motion vector scaling result does not exist on any of sampling points with the motion compensation precision, the vector obtained by rounding the fractions of the scaled motion vector to the nearest whole number is used.

Figure 15:
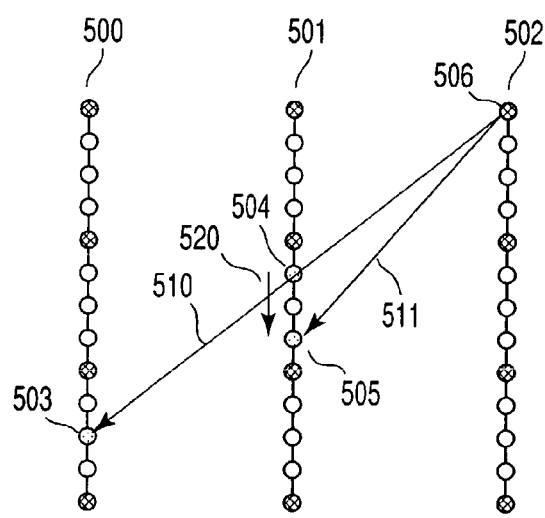
FIG. 15 is a view showing examples of motion vector information encoding and decoding methods according to the embodiment of the present invention.

FIG. 15 shows a motion vector information encoding and decoding methods according to the embodiment of the present invention, which differ from those shown in FIG. 14. In the case shown in FIG. 14, when the temporal moving speed of a moving picture is constant, the overhead for motion vectors with respect to encoded data can be efficiently reduced. In a case wherein the temporal movement of a moving picture is monotonous but the moving speed is not constant, the use of a simply scaled motion vector leads to a decrease in prediction efficiency and hence a decrease in encoding efficiency.

In the case shown in FIG. 15, as in the case shown in FIG. 14, a prediction pixel is generated from two reference frames 500 and 501 by using a pixel 506 as a reference pixel. Assume that a pixel 503 in the frame 500 and a pixel 505 in the frame 501 are referred to. As in the case shown in FIG. 14, a motion vector 510 with respect to the frame 500 is encoded. A differential vector 520 between a motion vector 511 with respect to the frame 501 and the vector obtained by scaling the motion vector 510 is encoded. That is, the motion vector 510 is scaled to ½. The position of a pixel 504 in the frame 501 is indicated, and the differential vector 520 indicating the difference amount between the prediction pixel 505 and the pixel 504 is encoded.

In general, the magnitude of the above differential vector decreases with respect to a temporally monotonous movement. Even if, therefore, the moving speed is not constant, the prediction efficiency does not decrease, and an increase in the overhead for a motion vector is suppressed. This makes it possible to perform efficient encoding.

Figure 16:
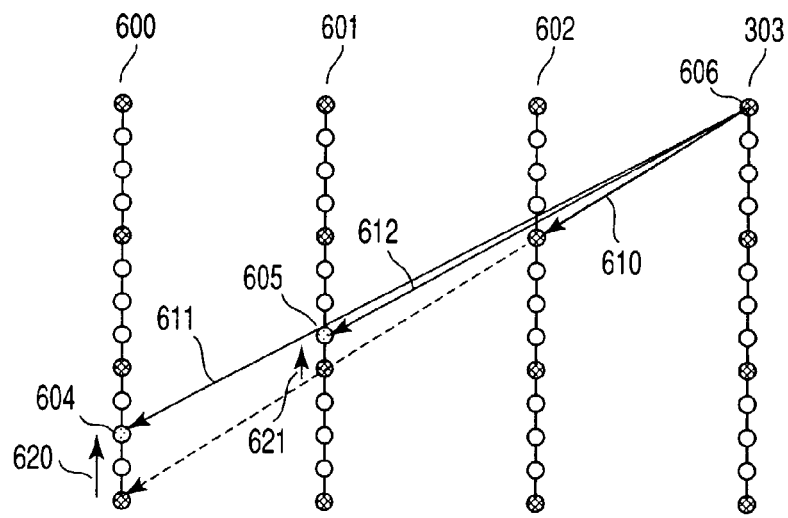
FIG. 16 is a view showing examples of motion vector information encoding and decoding methods according to the embodiment of the present invention.

FIG. 16 shows further motion vector information encoding and decoding methods according to the embodiment of the present invention. Referring to FIG. 16, a video frame 603 is a to-be-encoded frame, and frames 601 and 600 are used as reference frames with a frame 602 being skipped. With respect to a pixel 606, a pixel 604 in the reference frame 600 and a pixel 605 in the reference frame 601 are used as reference pixels to generate a prediction pixel. As in the case shown in FIG. 14 or 15, a motion vector 611 with respect to the reference frame 600 is encoded. A motion vector with respect to the reference frame 601 can also be generated by using the motion vector obtained by scaling the motion vector 611. In the case shown in FIG. 16, however, the motion vector 611 must be scaled to ⅔ in consideration of the distance between the reference frame and the video frame.

In the case shown in FIG. 16 and other cases, in order to perform arbitrary scaling, division is required because the denominator becomes an arbitrary integer other than a power of 2. Motion vectors must be scaled in both an encoding operation and decoding operation. Division, in particular, requires much cost and computation time in terms of both hardware and software, resulting in increases in encoding and decoding costs. Referring to FIG. 16, a motion vector 610 obtained by normalizing the motion vector 611 with the inter-frame distance is encoded. The differential vector between the motion vector obtained by scaling the normalized motion vector 610 and the original motion vector is encoded in accordance with the distance between the video frame and each reference frame. That is, the reference pixel 604 is generated from the motion vector obtained by tripling the normalized motion vector 610 and a differential vector 620. The reference pixel 605 is generated from the motion vector obtained by doubling the normalized motion vector 610 and a differential vector 621.

As described above, the arrangement shown in FIG. 16 prevents an increase in the encoding overhead for motion vectors, without decreasing the prediction efficiency. In addition, since scaling of a motion vector can be done by multiplication alone, increases in the computation costs for encoding and decoding operations can also be suppressed.

In this embodiment of the present invention, a motion vector or differential vector is encoded by using the spatial or temporal correlation between motion vectors in the following manner to further decrease the motion vector code amount.

Figure 17:
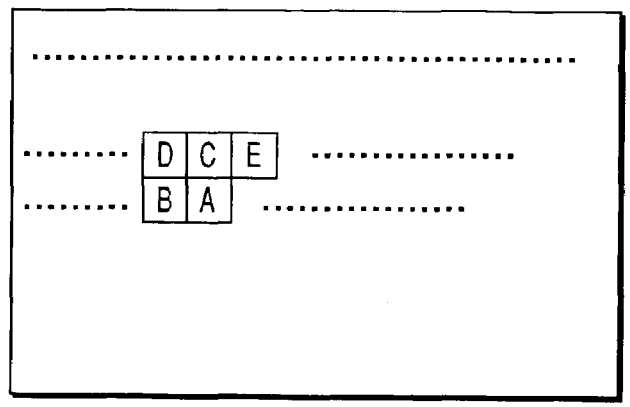
FIG. 17 is a view for explaining a motion vector information predictive encoding method according to the embodiment of the present invention.

A motion vector compression method using a spatial correlation will be described first with reference to FIG. 17. Referring to FIG. 17, reference symbols A, B, C, D, and E denote adjacent macroblocks in one frame. When a motion vector or differential vector of the macroblock A is to be encoded, a prediction vector is generated from the motion vectors of the adjacent macroblocks B, C, D, and E. Only the error between the motion vector of the prediction vector and that of the macroblock A is encoded. On the decoding side, a prediction vector is calculated in the same manner as in an encoding operation. The motion vector or differential vector of the macroblock A is generated by adding this prediction vector to the encoded error signal.

Encoding a motion vector error by variable length encoding or arithmetic encoding can compress the picture with high efficiency. A motion vector can be predicted by using, for example, the median or average value of the motion vectors of the macroblocks B, C, D, and E as a prediction vector.

A motion vector compression method using a temporal correlation will be described with reference to FIGS. 18A and 18B.

Figure 18A:
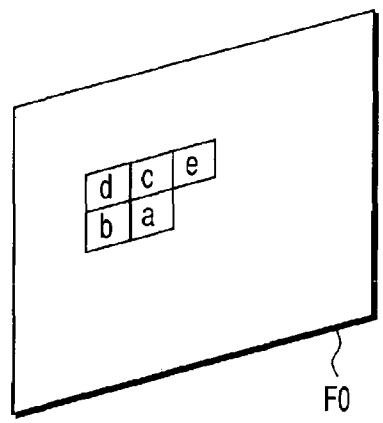
FIGS. 18A and 18B are views for explaining a motion vector information predictive encoding method according to the embodiment of the present invention.
Figure 18B:
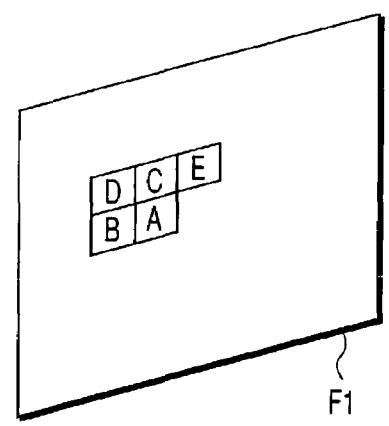

FIGS. 18A and 18B show two consecutive frames (F0, F1). Referring to FIGS. 18A and 18B, reference symbols A, B, C, D, and E denote adjacent macroblocks in the frame F1 and a, b, c, d, and e, macroblocks at the same positions as those of the macroblocks A, B, C, D, and E in the frame F0. When the motion vector or differential vector of the macroblock A is to be encoded, the motion vector of the macroblock a at the same position as that of the macroblock A is set as a prediction vector. The motion vector information can be compressed by encoding only the error between this prediction vector and the vector of the macroblock A.

A three-dimensional prediction is further made on the motion vector of the macroblock A by using a spatiotemporal correlation and the motion vectors of the macroblocks B, C, D, and E in the frame F1 and of the macroblocks a, b, c, d, and e in the frame F0. The motion vector can be compressed with higher efficiency by encoding only the error between the prediction vector and the to-be-encoded vector.

A three-dimensional prediction on a motion vector can be realized by generating a prediction vector from the median value, average value, or the like of a plurality of spatiotemporally adjacent motion vectors.

An embodiment of macroblock skipping according to the present invention will be described. Assume that in motion compensation predictive encoding, there are macroblocks in which all prediction error signals become 0 by DCT and quantization. In this case, in order to reduce the encoding overhead, macroblocks that satisfy predefined, predetermined conditions are not encoded, including the header data of the macroblocks, e.g., prediction modes and motion vectors. Of the headers of video macroblocks, only those of macroblocks corresponding to the number of macroblocks that are consecutively skipped are encoded. In a decoding operation, the skipped macroblocks are decoded in accordance with a predefined, predetermined mode.

In the first mode of macroblock skipping according to the embodiment of the present invention, macroblock skipping is defined to satisfy all the following conditions:

A reference frame to be used for a prediction is a predetermined frame.

All motion vector elements are 0.

All prediction error signals are 0.

In a decoding operation, a predictive macroblock is generated from predetermined reference frames as in the case wherein a motion vector is 0. The generated predictive macroblock is reconstructed as a decoded macroblock signal.

Assume that setting the linear sum of two immediately preceding frames as a reference frame is a skipping condition for a reference frame. In this case, macroblock skipping can be done even for a picture whose signal intensity changes over time, like a fading picture, thereby improving the encoding efficiency. Alternatively, the skipping condition may be changed for each frame by sending the index of a reference frame serving as a skipping condition as the header data of each frame. By changing the frame skipping condition for each frame, an optimal skipping condition can be set in accordance with the properties of an input picture, thereby reducing the encoding overhead.

In the second mode of macroblock skipping according to the embodiment of the present invention, a motion vector is predictively encoded. Assume that a macroblock skipping condition is that the error signal of a motion vector is 0. The remaining conditions are the same as those for macroblock skipping in the first mode described above. In the second mode, in decoding a skipped macroblock, a prediction motion vector is generated first. A prediction picture is generated from predetermined reference frames by using the generated prediction motion vector, and the decoded signal of the macroblock is generated.

In the third mode of macroblock skipping according to the embodiment of the present invention, a skipping condition is that to-be-encoded motion vector information is identical to the motion vector information encoded in the immediately preceding macroblock. To-be-encoded motion vector information is a prediction error vector when a motion vector is to be predictively encoded, and is a motion vector itself when it is not predictively encoded. The remaining conditions are the same as those in the first mode described above.

In the third mode of macroblock skipping, when a skipped macroblock is to be decoded, the to-be-encoded motion vector information is regarded as 0, and the motion vector is reconstructed. A prediction picture is generated from predetermined reference frames in accordance with the reconstructed motion vector, and the decoded signal of the macroblock is generated.

Assume that in the fourth mode of macroblock skipping, a combination of reference frames to be used for a prediction is identical to that for the immediately encoded macroblock. The remaining skipping conditions are the same as those in the first mode described above.

Assume that in the fifth mode of macroblock skipping, a combination of reference frames used for a prediction is identical to that for the immediately encoded macroblock. The remaining skipping conditions are the same as those in the first mode described above.

Assume that in the sixth mode of macroblock skipping, a combination of reference frames used for a prediction is identical to that for the immediately encoded macroblock. The remaining skipping conditions are the same as those in the third mode described above.

According to the skipping conditions in either of the first to sixth modes described above, a reduction in encoding overhead and highly efficient encoding can be realized by efficiently causing macroblock skipping by using the property that the correlation of movement between adjacent macroblocks or change in signal intensity over time is high.

FIG. 19 shows an embodiment in which a linear predictive coefficient estimator 701 is added to the video encoding apparatus according to the embodiment shown in FIG. 8. In the linear predictive coefficient estimator 701, predictive coefficients for a linear prediction are determined from a plurality of reference frames in accordance with the distance from each reference frame and a video frame, a temporal change in DC component within an input frame, and the like. A plurality of embodiments associated with determination of specific predictive coefficients will be described below.

Figure 20:
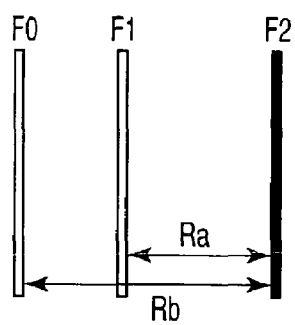
FIG. 20 is a view for explaining an example of a linear predictive coefficient determination method according to the embodiment of the present invention.

FIG. 20 shows a prediction method of predicting a frame from the linear sum of two past frames. Reference frames F0 and F1 are used for a video frame F2. Reference symbols Ra and Rb denote the inter-frame distances between the respective reference frames F0 and F1 and the video frame F2. Let W0 and W1 be linear predictive coefficients for the reference frames F0 and F1. A combination of first linear predictive coefficients is (0.5, 0.5). That is, this combination can be obtained from the simple average of the two reference frames. Second linear predictive coefficients are determined by linear extrapolation in accordance with the inter-frame distance. In the case shown in FIG. 20, linear predictive coefficients are given by equation (20). If, for example, the frame intervals are constant, Rb=2*Ra, and linear predictive coefficients given by:

$$(W_0, W_1) = \left( \frac{-Ra}{Rb - Ra}, \frac{Rb}{Rb - Ra} \right) \quad (2)$$

are (W0, W1)=(−1, 2).

According to equation (2), even if the inter-frame distance between each reference frame and the video frame arbitrarily changes, a proper linear prediction can be made. Even if, for example, variable-frame-rate encoding is performed by using frame skipping or the like or two arbitrary past frames are selected as reference frames, high prediction efficiency can be maintained. In an encoding operation, one of the first and second predictive coefficients may be permanently used or the first or second predictive coefficients may be adaptively selected. As a practical method of adaptively selecting predictive coefficients, a method of selecting predictive coefficients by using the average luminance value (DC value) in each frame may be used.

Assume that the average luminance values in the frames F0, F1, and F2 are DC(F0), DC(F1), and DC(F2), respectively. The magnitudes of prediction errors obtained by using the respective linear predictive coefficients are calculated by $$\left| DC(F2) - \left( \frac{DC(F0) + DC(F1)}{2} \right) \right| \quad (3)$$

$$\left| DC(F2) - \left( \frac{Rb}{Rb - Ra} DC(F1) - \frac{Ra}{Rb - Ra} DC(F0) \right) \right| \quad (4)$$

If the value of mathematic expression (3) is smaller than that of mathematic expression (4), the first predictive coefficient is selected. If the value of mathematic expression (4)

is smaller than that of mathematic expression (3), the second predictive coefficient is selected. By changing these predictive coefficients for each video frame, an optical linear prediction can be made in accordance with the characteristics of a video signal. Efficient linear prediction can also be made by determining the third and fourth predictive coefficients by using the ratios of DC values in the frames according to equation (5) or (6):

$$(W_0, W_1) = \left(\frac{1}{2} \cdot \frac{DC(F2)}{DC(F0)}, \frac{1}{2} \cdot \frac{DC(F2)}{DC(F1)}\right) \quad (5)$$

$$(W_0, W_1) = \left(\frac{-Ra}{Rb-Ra} \cdot \frac{DC(F2)}{DC(F0)}, \frac{Rb}{Rb-Ra} \cdot \frac{DC(F2)}{DC(F1)}\right) \quad (6)$$

The third linear predictive coefficient given by equation (5) is the weighted mean calculated in consideration of the ratios of the DC values in the frames. The fourth linear predictive coefficient given by equation (6) is the linear predictive coefficient calculated in consideration of the ratios of the DC values in the frames and the inter-frame distances. In the use of the above second to fourth linear predictive coefficients, linear predictions require division. However, matching the computation precision at the time of encoding with that at the time of decoding allows a linear prediction based on multiplications and bit shifts without any division.

Figure 21:
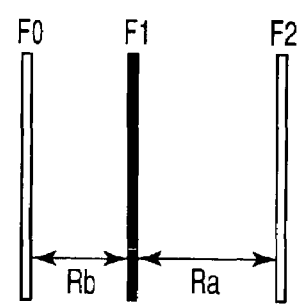
FIG. 21 is a view for explaining an example of a linear predictive coefficient determination method according to the embodiment of the present invention.

A practical syntax may be set such that each linear predictive coefficient is expressed by a denominator to a power of 2 and an integer numerator, as in the case shown in FIG. 10. FIG. 21 shows a method of predicting a frame from the linear sum of two temporally adjacent frames. Referring to FIG. 21, reference symbol F1 denotes a to-be-encoded frame; F0 and F2, reference frames; and Ra and Rb, the inter-frame distances between the respective reference frames and the video frame. In addition, linear predictive coefficients for the reference frames F0 and F2 are represented by W0 and W2, respectively. The intra-frame average values of the luminance values of the respective frames are represented by DC(F0), DC(F1), and DC(F2), respectively. Four types of predictive coefficient combinations like those in FIG. 20 are given by $$(W_0, W_2) = (0.5, 0.5) \quad (7)$$

$$(W_0, W_2) = \left(\frac{Ra}{Rb+Ra}, \frac{Rb}{Rb+Ra}\right) \quad (8)$$

$$(W_0, W_2) = \frac{1}{2} \cdot \frac{DC(F1)}{DC(F0)}, \frac{1}{2} \cdot \frac{DC(F1)}{DC(F2)} \quad (9)$$

$$(W_0, W_2) = \left(\frac{Ra}{Rb+Ra} \cdot \frac{DC(F1)}{DC(F0)}, \frac{Rb}{Rb+Ra} \cdot \frac{DC(F1)}{DC(F2)}\right) \quad (10)$$

Equation (7) represents a simple average prediction; equation (8), a weighted mean prediction based on an inter-frame distances, equation (9), a weighed mean prediction based on the ratios of the DC values; and equation (10), a weighting prediction based on the ratios of the DC values and the inter-frame distances.

Figure 22:
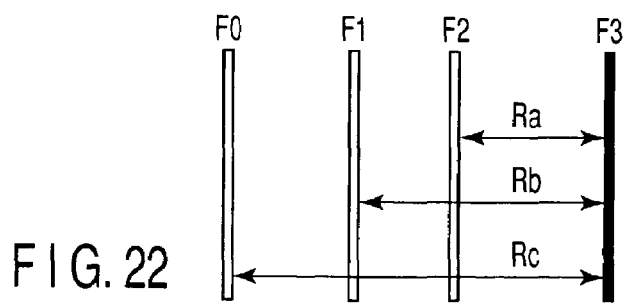
FIG. 22 is a view for explaining an example of a linear predictive coefficient determination method according to the embodiment of the present invention.

FIG. 22 shows a method of performing a predetermined prediction based on the linear sum of three past frames. Reference symbols F0, F1, and F2 denote reference frames; F3, a video frame; and Rc, Rb, and Ra, the inter-frame distances between the respective reference frames F0, F1, and F2 and the video frame F3. In the case shown in FIG. 22 as well, a plurality of linear predictive coefficient combinations can be conceived. The following is a specific example. Assume that the linear predictive coefficients for the respective reference frames are represented by W0, W1, and W2.

A combination of first predictive coefficients is given by equation (22). The first predictive coefficients are used for a simple average prediction based on three reference frames. A prediction picture $F_3^{012}$ based on the first predictive coefficient combination is represented by $$(W_0, W_1, W_2) = \left(\frac{1}{3}, \frac{1}{3}, \frac{1}{3}\right) \quad (11)$$

$$aF_0^{012} = \frac{1}{3}(F1 + F2 + F3) \quad (12)$$

The second, third, and fourth predictive coefficients are coefficients for performing an extrapolation prediction based on linear extrapolation by selecting two frames from the three reference frames as in the case of a prediction based on equation (2). Letting $eF_3^{12}$ be a prediction picture of the video frame F3 which is predicted from the reference frames F2 and F1, $eF_3^{02}$ be a prediction picture of the video frame f3 which is predicted from the reference frames F2 and F0, and $eF_3^{01}$ be a prediction picture of the video frame F3 which is predicted from the reference frames F1 and F0, these prediction pictures are respectively represented by $$eF_3^{12} = \frac{Rb}{Rb-Ra} F2 - \frac{Ra}{Rb-Ra} F1 \quad (13)$$

$$eF_3^{02} = \frac{Rc}{Rc-Ra} F2 - \frac{Ra}{Rc-Ra} F0 \quad (14)$$

$$eF_3^{01} = \frac{Rc}{Rc-Rb} F1 - \frac{Rb}{Rc-Rb} F0 \quad (15)$$

Letting $eF_3^{012}$ be a prediction value obtained by averaging the values given by equations (13) to (15), the prediction value $eF_3^{012}$ can be given as the fifth predictive coefficient by $$eF_3^{012} = \frac{1}{3} \frac{2RaRb - RaRc - RbRc}{(Rc-Ra)(Rc-Rb)} F0 + \quad (16)$$
$$\frac{1}{3} \frac{RaRb - 2RaRc + RbRc}{(Rc-Rb)(Rb-Ra)} F1 +$$
$$\frac{1}{3} \frac{-RaRb - RaRc + 2RbRc}{(Rc-Ra)(Rb-Ra)} F2$$

One of the first to fifth linear predictive coefficients may be used. Alternatively, intra-frame average luminance values DC(F0), DC(F1), DC(F2), and DC(F3) of the frames F0, F1, F2, and F3 may be calculated, and the intra-frame average luminance value of the video frame F3 may be predicted by using each of the above five predictive coefficients. One of the predictive coefficients which exhibits a minimum prediction error may be selectively used for each video frame. The use of the latter arrangement allows automatic selection of an optimal linear prediction on the frame basis in accordance with the properties of an input picture and can realize high-efficiency encoding.

In addition, the predictive coefficients obtained by multiplying the first to fifth linear predictive coefficients by the ratios of the average luminance values of the respective frames may be used. If, for example, the first predictive coefficient is multiplied by the ratios of the average luminance values, a predictive coefficient is given by equation (17) be low. This applies to the remaining predictive coefficients.

$$(W_0, W_1, W_2) = \left(\frac{1}{3} \cdot \frac{DC(F3)}{DC(F0)}, \frac{1}{3} \cdot \frac{DC(F3)}{DC(F1)}, \frac{1}{3} \cdot \frac{DC(F3)}{DC(F2)}\right) \quad (17)$$

Figure 23:
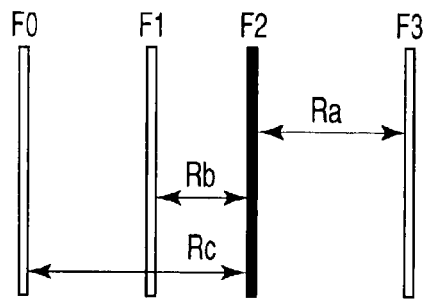
FIG. 23 is a view for explaining an example of a linear predictive coefficient determination method according to the embodiment of the present invention.

FIG. 23 shows a method of performing a prediction based on the linear sum of two past frames and one future frame. Reference symbols F0, F1, and F3 denote reference frames; F2, a video frame; and Rc, Rb, and Ra, the inter-frame distances between the reference frames F0, F1, and F3 and the video frame. In this case, as in the case shown in FIG. 29, a plurality of predictive coefficient combinations can be determined by using the ratios of the inter-frame distances and the DC values in the respective frames. In addition, an optimal predictive coefficient combination can be determined from the prediction errors of the DC values in the frames.

Linear prediction expressions or predictive coefficients corresponding to equations (12) to (17) in the prediction method in FIG. 23 are expressed by $$aF_2^{013} = \frac{1}{3}(F0 + F1 + F3) \quad (18)$$

$$eF_2^{13} = \frac{Rb}{Rb+Ra}F3 + \frac{Ra}{Rb+Ra}F1 \quad (19)$$

$$eF_2^{03} = \frac{Rc}{Rc+Ra}F3 + \frac{Ra}{Rc+Ra}F0 \quad (20)$$

$$eF_2^{01} = \frac{Rc}{Rc-Rb}F1 - \frac{Rb}{Rc-Rb}F0 \quad (21)$$

$$eF_3^{013} = \frac{1}{3}\frac{-2RaRb - RaRc - RbRc}{(Rc+Ra)(Rc-Rb)}F0 + \frac{1}{3}\frac{-RaRb + 2RaRc + RbRc}{(Rc-Rb)(Rb+Ra)}F1 + \frac{1}{3}\frac{RaRb + RaRc + 2RbRc}{(Rc+Ra)(Rb+Ra)}F3 \quad (22)$$

$$(W_0, W_1, W_3) = \left(\frac{1}{3} \cdot \frac{DC(F2)}{DC(F0)}, \frac{1}{3} \cdot \frac{DC(F2)}{DC(F1)}, \frac{1}{3} \cdot \frac{DC(F2)}{DC(F3)}\right) \quad (23)$$

Figure 24:
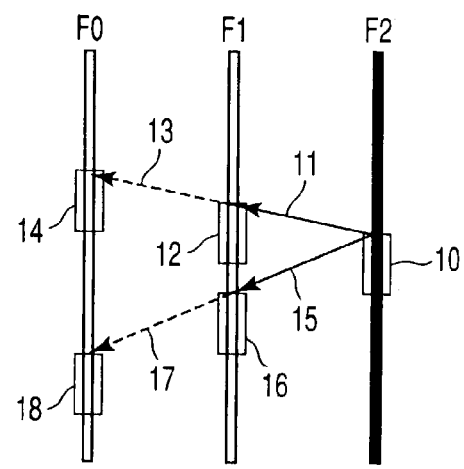
FIG. 24 is a view for explaining an example of a linear predictive coefficient determination method according to the embodiment of the present invention.

FIG. 24 shows the first example of a motion vector search in video encoding according to the embodiment of the present invention. FIG. 24 shows a motion vector search method in a case wherein a prediction is made by using two consecutive frames as reference frames, and one representative motion vector is encoded, as shown in FIG. 14. Referring to FIG. 24, reference symbol F2 denotes a video frame; and F0 and F1, reference frames. Reference numeral 10 denotes a video macroblock; and 12, 14, 16, and 18, some reference macroblock candidates in the reference frames.

In order to obtain an optimal motion vector for the macroblock 10, motion vector candidates (motion vector candidates 11 and 15 in FIG. 24) for the reference frame F1 within a motion vector search range and the motion vectors (a motion vector 13 obtained by scaling the motion vector candidate 11 and a motion vector 17 obtained by scaling the motion vector candidate 15 in FIG. 24) obtained by scaling the motion vector candidates in accordance with the inter-frame distance are used as motion vectors for the reference frame F0. A predictive macroblock is generated from the linear sum of the reference macroblocks 14 and 12 or 16 and 18 extracted from the two reference frames F0 and F1. The differential value between the predictive macroblock and the to-be-encoded macroblock 10 is calculated. When this differential value becomes minimum, the corresponding motion vector is determined as a motion vector search result for each macroblock. Motion compensation predictive encoding is then performed for each macroblock by using the determined motion vector.

A motion vector may be determined in consideration of the encoding overhead for each motion vector itself as well as the above differential value. A motion vector may be selected, which exhibits a minimum code amount required to actually encode a differential signal and the motion vector. As described above, the motion vector search method can obtain an accurate motion vector with a smaller computation amount than in the method of separately searching for optimal motion vectors for the reference frames F0 and F1.

Figure 25:
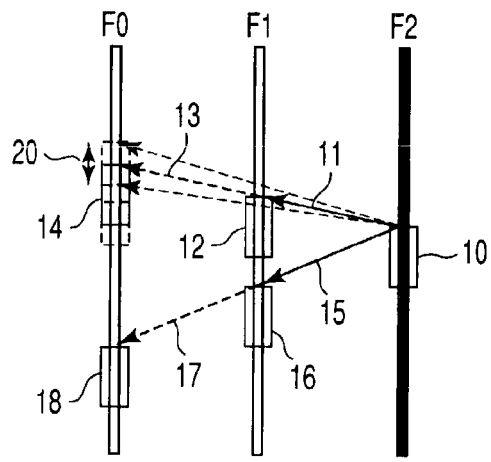
FIG. 25 is a view for explaining a motion vector search method according to the embodiment of the present invention.

FIG. 25 shows the second example of a motion vector search in video encoding according to the embodiment of the present invention. FIG. 25 shows a motion vector search method in a case wherein a current frame is predicted by using two consecutive frames as reference frames, and one representative motion vector is encoded or one representative motion vector and a differential vector are encoded, as shown in FIG. 14, by the same method as that shown in FIG. 24. Referring to FIG. 25, reference symbol F2 denotes a video frame; and F0 and F1, reference frames. Reference numeral 10 denotes a video macroblock; and 12, 14, 16, and 18, reference macroblock candidates in the reference frames.

In the second motion vector search, a search is made for one motion vector with respect to the two reference frames as in the first motion vector search. Referring to FIG. 25, a motion vector 11 and a motion vector 13 obtained by scaling the motion vector 11 are selected as optical motion vectors. A re-search is made for a motion vector with respect to a reference macroblock from the frame F0 in an area near the motion vector 13. In re-search operation, the reference frame 12 extracted from the frame F1 by using the motion vector 11 is fixed. A predictive macroblock is generated from the linear sum of the reference frame 12 and the reference frame 14 extracted an area near the motion vector 13 of the frame F0. A re-search is made for a motion vector with respect to the frame F0 so as to minimize the difference between the predictive macroblock and the to-be-encoded macroblock.

Assume that a video signal is set at a constant frame rate, and the interval between the frames F2 and F1 and the interval between the frames F1 and F0 are equal. In this case, in order to search for a constant movement, a search range with respect to the reference frame F0 needs to be four times larger in area ratio than a search range with respect to the reference frame F1. A search for a motion vector with respect to the two reference frames F0 and F1 with the same precision requires a computation amount fourth times larger than that for a search for a motion vector in a prediction only from the reference frame F1.

According to the second motion vector search method, first of all, a search is made for a motion vector with respect to the reference frame F1 with full precision. The reference frame F0 is then searched for a motion vector obtained by scaling this motion vector twice. The reference frame F0 is re-searched with full precision. The use of such two-step search operation can reduce the computation amount for a motion vector search to almost ¼.

In the second motion vector search method, motion vectors for the reference frames F0 and F1 are separately obtained. In encoding these motion vectors, first of all, the motion vector 11 for the reference frame F1 is encoded. The differential vector between the motion vector 13 obtained by scaling the motion vector 11 and the motion vector obtained as the result of re-searching the reference frame F0 is encoded. This makes it possible to reduce the encoding overhead for each motion vector.

A search is made for the motion vector 13 obtained scaling the motion vector 11 in a re-search range of ±1, i.e., with a coarse precision of ½. Only a re-search is made for the motion vector 13 with full precision. In this case, the motion vector with respect to the re-searched reference frame F0 is scaled to ½. This makes it possible to uniquely reconstruct the motion vector 11 with respect to the reference frame F1 regardless of the re-search result. Therefore, only the motion vector with respect to the reference frame F0 may be encoded. In a decoding operation, the motion vector 11 with respect to the reference frame F1 can be obtained by scaling the received motion vector to ½.

Figure 26:
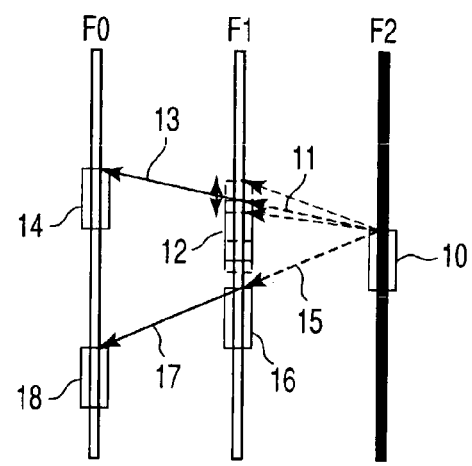
FIG. 26 is a view for explaining a motion vector search method according to the embodiment of the present invention.

FIG. 26 shows the third motion vector search method. In this motion vector search method, a current frame is predicted by using two consecutive frames as reference frames, as in the method shown in FIG. 24, as shown in FIG. 14. One representative motion vector is encoded, or one representative motion vector and a differential vector are encoded. Referring to FIG. 26, reference symbol F2 denotes a video frame; and F0 and F1, reference frames. Reference numeral 10 denotes a video macroblock; and 12, 14, 16, and 18, some reference macroblock candidates in the reference frames.

In the third motion vector search, as in the first or second example, searches are made for motion vectors with respect to the reference frames F0 and F1, and a re-search is made for a motion vector with respect to the reference frame F1. In general, in a moving picture, the correlation between frames that are temporally close to each other is strong. On the basis of this property, the prediction efficiency can be improved by obtaining a motion vector with respect to the reference frame F1 temporally closest to the reference frame F2 with higher precision in the third motion vector search.

Figure 27:
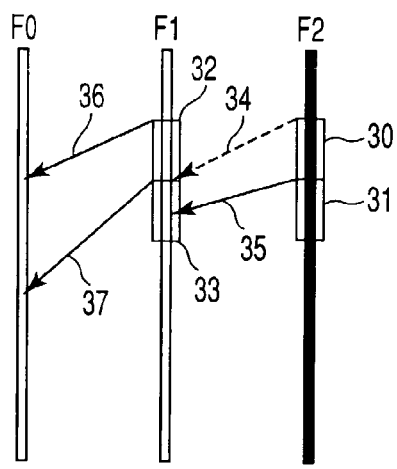
FIG. 27 is a view for explaining a motion vector encoding method according to the embodiment of the present invention.

FIG. 27 shows a motion vector encoding method according to the embodiment of the present invention. FIG. 27 shows a video frame F2, a frame F1 encoded immediately before the frame F2, and video macroblocks 30 and 31. Macroblocks 32 and 33 are located at the same positions as those of the macroblocks 30 and 31 in the frame F1. FIG. 27 also shows video macroblocks 34 and 35 for the macroblocks 30 and 31, and encoded motion vectors 36 and 37 for the macroblocks 32 and 33.

In this embodiment, if a to-be-encoded motion vector is identical to a motion vector for a macroblock at the same position in the immediately preceding video frame, the motion vector is not encoded, and a flag indicating that the motion vector is identical to that for the macroblock at the same position in the immediately preceding video frame is encoded as a prediction mode. If the motion vector is not identical to that for the macroblock at the same position in the immediately preceding video frame, the motion vector information is encoded. In the method shown in FIG. 27, the motion vectors 34 and 36 are identical. Therefore, the motion vector 34 is not encoded. In addition, since the motion vector 35 differs from the motion vector 37, the motion vector 35 is encoded.

Encoding motion vectors in the above manner reduces the redundancy of motion vectors with respect to a still picture or a picture which makes a temporally uniform movement and hence can improve the encoding efficiency.

Figure 28:
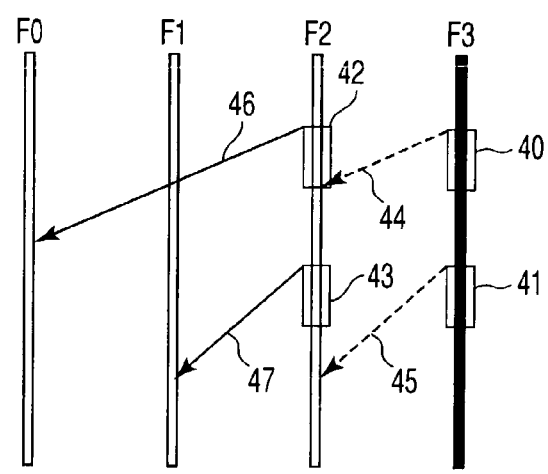
FIG. 28 is a view for explaining a motion vector encoding method according to the embodiment of the present invention.

FIG. 28 shows another motion vector encoding method according to the embodiment of the present invention. In the method shown in FIG. 28, as in the method shown in FIG. 27, if a motion vector for a macroblock at the same position in the immediately preceding video frame is identical to a motion vector for a video macroblock, the motion vector is not encoded. Whether motion vectors are identical to each other is determined depending on whether their moving angles are identical. Referring to FIG. 28, a motion compensation prediction is performed with respect to macroblocks 40 and 41 in a video frame F3 by setting an immediately preceding video frame F2 as a reference frame and using motion vectors 44 and 45. With respect to a macroblock 42 at the same position as that of the macroblock 40 in the video frame F2 immediately preceding a frame F1, a motion compensation prediction is performed by setting a frame F0 two frames back with respect to the frame F2 as a reference frame and using a motion vector 46.

Although the motion vectors 46 and 44 exhibit the same angle, the size of the motion vector 46 is twice that of the motion vector 44. Therefore, the motion vector 44 can be reconstructed by scaling the motion vector 46 in accordance with the inter-frame distance. For this reason, the motion vector 44 is not encoded, and prediction mode information indicating a mode of using a motion vector for the immediately preceding frame is set.

The motion vector 45 for the macroblock 41 exhibits the same angle as a motion vector 47 for the macroblock 43 at the same position in the preceding frame, and hence the motion vector 45 is not encoded as in the case of the macroblock 40. A macroblock for which a motion vector is not encoded as in the above case is subjected to motion compensation predictive inter-frame encoding and decoding by using the motion vector obtained by scaling the motion vector at the same position in the preceding video frame in accordance with the inter-frame distance between the video frame and the reference frame.

Figure 29:
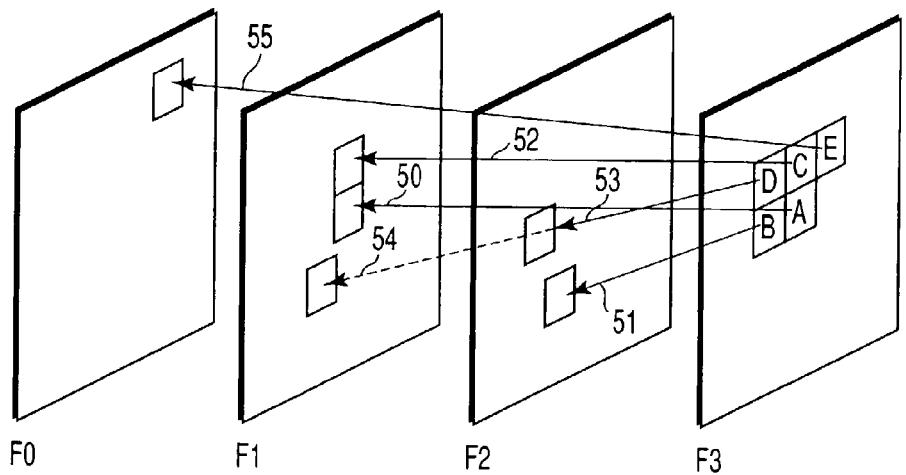
FIG. 29 is a view showing an inter-frame prediction relationship according to the embodiment of the present invention.

FIG. 29 is a view for explaining macroblock skipping and predictive encoding of an index indicating a reference frame according to the embodiment of the present invention. Referring to FIG. 29, reference symbol F3 denotes a video frame; A, a video macroblock; B, C, D, and E, adjacent macroblocks that have already been encoded; and F0, F1, and F2, reference frames, one or a plurality of which are selected and subjected to motion compensation predictive encoding for each macroblock. With respect to the macroblock A, a prediction is performed based on a motion vector 50 by using the frame F1 as a reference frame. With respect to the macroblocks B, C, and E, predictions are performed based on motion vectors 51, 52, and 55 by using the frames F2, F1, and F0 as reference frames, respectively. The macroblock D is predicted by using the reference frames F1 and F2. When the motion vector 50 of the macroblock A is to be encoded, a prediction vector is selected from the motion vectors of the adjacent macroblocks B, C, D, and E, and the differential vector between the prediction vector and the motion vector 50 is encoded.

A prediction vector is determined by, for example, a method of selecting a motion vector corresponding to the median value of the motion vectors of the adjacent macroblocks B, C, and E or a method of selecting, as a prediction vector, the motion vector of one of the adjacent macroblocks B, C, D, and E which exhibits a minimum residual error signal.

Assume that the difference between the prediction vector and the motion vector of the to-be-encoded macroblock becomes 0, the reference frame having the macroblock for which the prediction vector is selected coincides with the reference frame having the video macroblock to be encoded, and all the prediction error signals to be encoded become 0. In this case, the macroblock is skipped without being encoded. The number of macroblocks consecutively skipped is encoded as header information of a video macroblock to be encoded next without being skipped. Assume that a prediction vector for the macroblock A becomes the motion vector 52 of the macroblock C. In this case, the macroblock A coincides with the macroblock C in terms of reference frame, and the motion vector 50 coincides with the motion vector 52. If all the prediction error signals of the macroblock A are 0, the macroblock is skipped without being encoded. At the time of decoding, a prediction vector is selected by the same method as that used at the time of encoding, and a prediction picture is generated by using the reference frame of the macroblock for which the prediction vector is selected. The generated prediction picture is a decoded picture of the skipped macroblock.

If one of the above macroblock skipping conditions is not satisfied, the differential vector between the prediction vector and the motion vector of the video macroblock, the prediction error signal, and an index indicating the reference frame are encoded.

As the index indicating the reference frame, the differential value between the reference frame index of an adjacent macroblock for which a prediction vector is selected and the reference frame index of the video frame is encoded.

When the motion vector 52 of the macroblock C is selected as the prediction vector of the macroblock A as in the above case, the differential vector between the motion vector 50 and the motion vector 52 and the prediction error signal of the macroblock A are encoded. Alternatively, for example, in accordance with the table shown in FIG. 11, a reference frame is expressed by an index (Code_number). A differential value between the index 2 indicating a reference frame for the macroblock C two frames back and the index 2 of the macroblock A, i.e., 0, is encoded as a reference frame index differential value.

Figure 30:
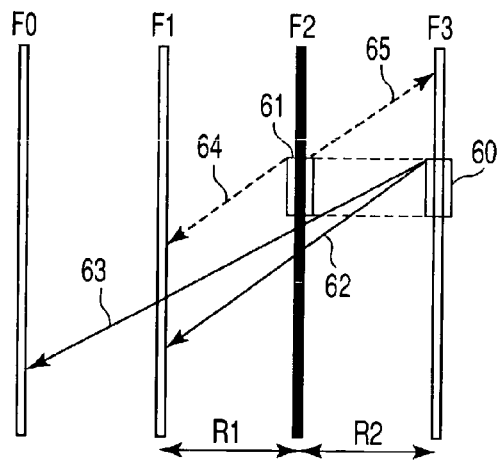
FIG. 30 is a view for explaining a motion vector encoding method according to the embodiment of the present invention.

FIG. 30 shows another motion vector encoding method according to the embodiment of the present invention. Referring to FIG. 30, a frame F2 is a video frame to be encoded, which is a B picture for which a motion compensation prediction is performed from temporally adjacent frames. With respect to a macroblock 61 in the frame F2, a frame F3 is used as a reference frame for a backward prediction, and a frame F1 is used as a reference frame for a forward prediction. Therefore, the frame F3 is encoded or decoded before the frame F2 is encoded or decoded.

In the reference frame f3 for a backward prediction for the video macroblock 61, a macroblock 60 at the same position as that of the video macroblock 61 in the frame will be considered. If a motion compensation prediction based on the linear sum of the frames F0 and F1 is used, the motion vector (62 in FIG. 30) of the macroblock 60 corresponding to the reference frame F1 for a forward prediction for the video macroblock 61 is scaled in accordance with the inter-frame distance, and the resultant vector is used as a vector for forward and backward predictions for the video macroblock 61.

Letting R1 be the inter-frame distance from the frame F1 to the frame F2, and R2 be the inter-frame distance from the frame F2 to the frame F3, the motion vector obtained by multiplying the motion vector 62 by R1/(R1+R2) becomes a motion vector 64 for a forward prediction for the macroblock 61. The motion vector obtained by multiplying the motion vector 62 by −R2/(R1+R2) becomes a motion vector 65 for a backward prediction for the macroblock 61.

With respect to the video macroblock 61, the above motion vector information is not encoded, and only a flag indicating the above prediction mode, i.e., the execution of a bi-directional prediction by motion vector scaling, is encoded.

In a decoding operation, the frame F3 is decoded first. The motion vectors of the respective macroblocks of the decoded frame F3 are temporarily stored. In the frame F2, with respect to the macroblock for which the flag indicating the above prediction mode is set, motion vectors for forward and backward predictions at the macroblock 60 are calculated by scaling the motion vector of a macroblock at the same position in the frame F3, thereby performing bi-directional predictive decoding.

Figure 31:
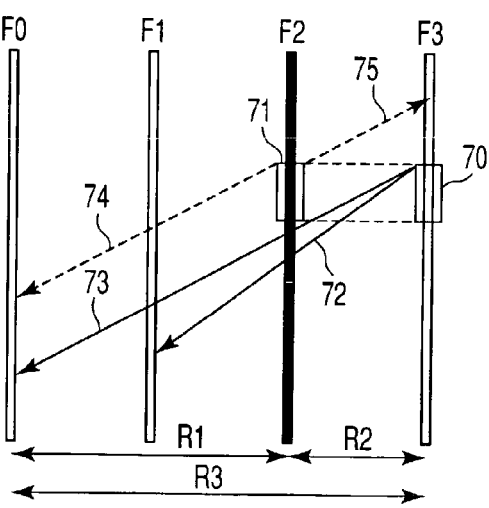
FIG. 31 is a view for explaining a motion vector encoding method according to the embodiment of the present invention.

FIG. 31 shows another example of the bi-directional prediction shown in FIG. 30. Referring to FIG. 31, a frame F0 is a reference frame for a forward prediction for a video macroblock 71 of a video frame F2, and the other arrangements are the same as those in FIG. 30. In this case, forward and backward motion vectors for the video macroblock 71 are obtained by scaling a motion vector 73 of a macroblock 70 with respect to a frame F3, which is located at the same position as that of the video macroblock 71, to the frame F0 in accordance with the inter-frame distance.

Letting R1 be the inter-frame distance from the frame F0 to the frame F2, R2 be the inter-frame distance from the frame F3 to the frame F2, and R3 be the inter-frame distance from the frame F0 to the frame F3, the vector obtained by multiplying the motion vector 73 by R1/R3 is a forward motion vector 74 for the video macroblock 71. The vector obtained by multiplying the motion vector 73 by −R2/R3 is a backward motion vector 75 for the video macroblock 71. Bi-directional predictive encoding and decoding of the video macroblock 71 are performed by using the motion vectors 74 and 75.

In the methods shown in FIGS. 30 and 31, in a reference frame for a backward prediction for a bi-directional prediction video macroblock to be encoded, a macroblock at the same position as that of the video macroblock in the frame will be considered. When this macroblock uses a plurality of forward reference frames, forward and backward motion vectors for the video macroblock are generated by scaling a motion vector with respect to the same reference frame as the forward reference frame for the bi-directional prediction video macroblock.

Generating motion vectors by scaling in the above manner can reduce the encoding overhead for the motion vectors and improve the encoding efficiency. In addition, if there are a plurality of motion vectors on which scaling is based, the prediction efficiency can be improved by selecting motion vectors exhibiting coincidence in terms of forward reference frame and scaling them. This makes it possible to realize high-efficiency encoding.

Figure 32:
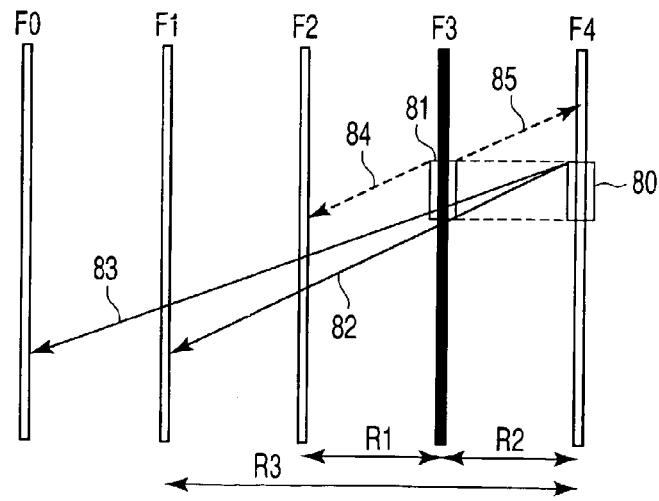
FIG. 32 is a view for explaining a motion vector encoding method according to the embodiment of the present invention.

FIG. 32 shows another method for the bi-directional predictions shown in FIGS. 30 and 31. Referring to FIG. 32, a frame F3 is a video frame to be encoded, and a video macroblock 81 to be encoded is predicted by a bi-directional prediction using a frame F4 as a backward reference frame and a frame F2 as a forward reference frame. A macroblock 80 in the frame F4 which is located at the same position as that of the video macroblock 81 is predicted by the linear sum of two forward frames F0 and F1. In the method shown in FIG. 32, therefore, the same forward reference frame is not used for the macroblock 80 and the video macroblock 81, unlike the methods shown in FIGS. 30 and 31.

In this case, a motion vector with respect to one of the forward reference frames F0 and F1 for the macroblock 80 which is temporally closer to the forward reference frame F2 for the video macroblock 81 is scaled in accordance with the inter-frame distance. With this operation, forward and backward vectors for the video macroblock 81 are generated. Letting R1 be the inter-frame distance from the frame F2 to the frame F3, R2 be the inter-frame distance from the frame F4 to the frame F3, and R3 be the inter-frame distance from the frame F1 to the frame F4, a forward motion vector 84 for the video macroblock 81 is obtained by multiplying a motion vector 82 of the macroblock 80 with respect to the frame F1 by R1/R3. A backward motion vector 85 for the to-be-encoded macroblock 81 is obtained by multiplying the motion vector 82 by −R2/R3. The video macroblock 81 is bi-directionally predicted by using the motion vectors 84 and 85 obtained by scaling.

Generating motion vectors by scaling in the above manner can reduce the encoding overhead the motion vectors and improve the encoding efficiency. In addition, if there are a plurality of motion vectors on which scaling is based, and there are no motion vectors exhibiting coincidence in terms of forward reference frame, a motion vector corresponding to a reference frame temporally closest to the forward reference frame for the video macroblock is selected and scaled. This makes it possible to improve the prediction efficiency and realize high-efficiency encoding.

Figure 33:
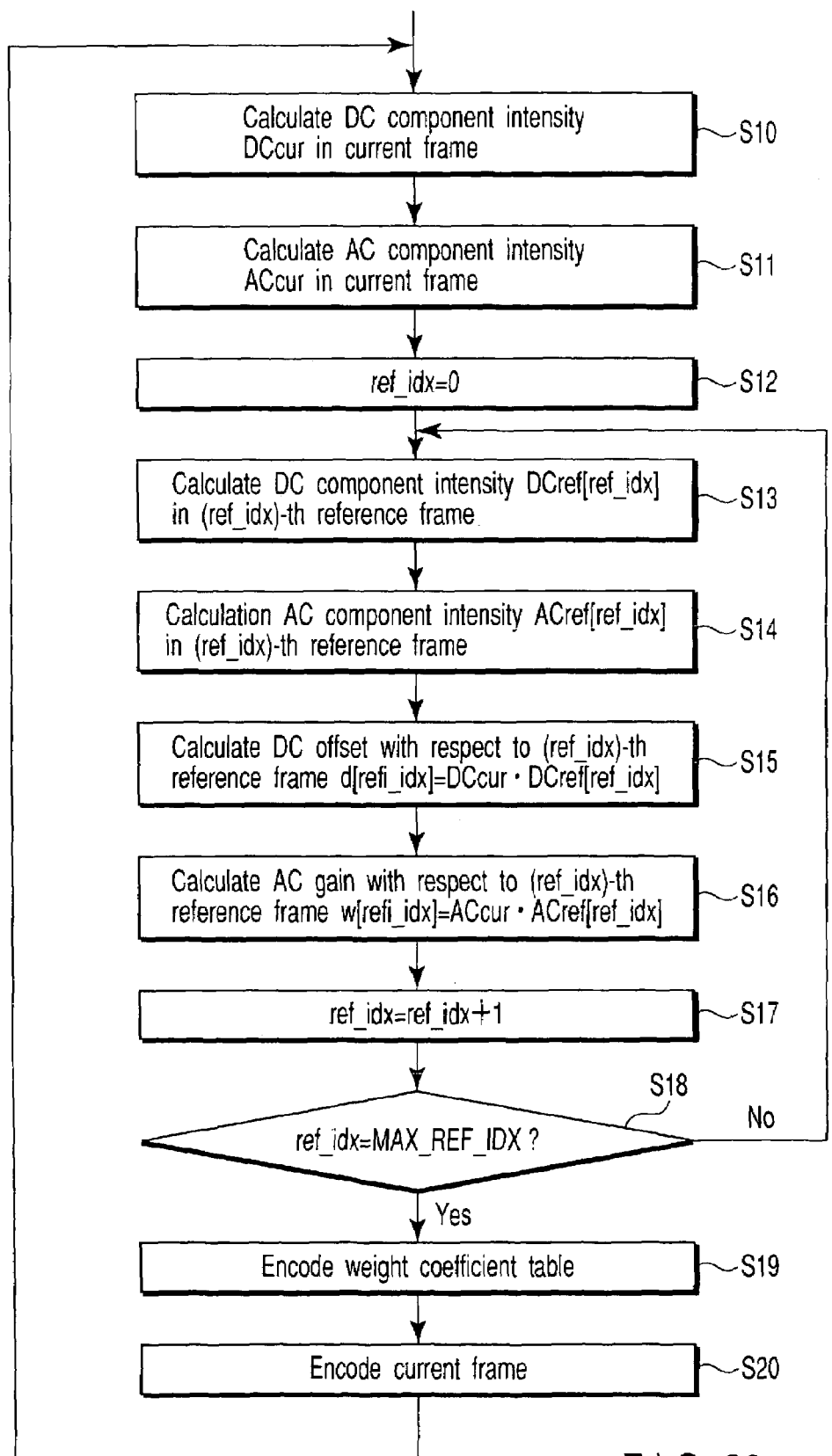
FIG. 33 is a flow chart showing a procedure for video encoding according to the embodiment of the present invention.

FIG. 33 is a flow chart of the video encoding method according to the embodiment of the present invention. FIG. 34 is a view for explaining a weighting prediction according to the embodiment of the present invention. A weighting prediction according to the embodiment will be described with reference to FIG. 34. A weight factor determination method will then be described with reference to FIG. 33.

Referring to FIG. 34, reference symbols F0, F1, F2, and F3 denote temporally consecutive frames. The frame F3 is a video frame to be encoded. The frames F0, F1, and F2 are reference frames for the video frame F3.

Of to-be-encoded pixel blocks A, B, C, and D in the video frame F3, for the blocks A, B, and C, reference pixel block signals with motion compensation are generated from the frames F1, F0, and F2, respectively. With respect to these reference pixel block signals, a prediction pixel block signal is generated by multiplications of weight factors and addition of DC offset values. The difference between the prediction pixel block signal and the to-be-encoded pixel block signal is calculated, and the differential signal is encoded, together with the identification information of the reference frames and motion vector information.

With respect to the block D, reference block signals with motion compensation are respectively generated from the frames F0 and F1. A prediction pixel block signal is generated by adding a DC offset value to the linear combination of the reference pixel blocks. The difference signal between the to-be-encoded pixel block signal and the prediction pixel block signal is encoded, together with the identification information of the reference frames and motion vector information.

In a decoding operation, the identification information of the reference frames and motion vector information are decoded. The above reference pixel block signals are generated on the basis of these pieces of decoded information. A prediction pixel block signal is generated by performing multiplications of weight factors and addition of a DC offset value with respect to the generated reference pixel block signals. The encoded difference signal is decoded, and the decoded differential signal is added to the prediction pixel block signal to decode the video picture.

Prediction pixel block signals are generated in encoding and decoding operations by the following calculation. Letting predA be a prediction signal for the pixel block A, and ref[1] be a reference pixel block signal extracted from the frame F1, the signal predA is calculated by $$predA = w[1] \cdot ref[1] + d[1] \qquad (24)$$

where w[1] is a weight factor for the reference pixel block, and d[1] is a DC offset value. These values are encoded as header data for each video frame or slice in a coefficient table. Weight factors and DC offset values are separately determined for a plurality of reference frames corresponding to each video frame. For example, with respect to the pixel block B in FIG. 34, since a reference pixel block ref[0] is extracted from the frame F0, a prediction signal predB is given by $$predB = w[0] \cdot red[0] + d[0] \qquad (25)$$

With respect to the pixel block D, reference pixel blocks are extracted from the frames F0 and F1, respectively. These reference pixel blocks are multiplied by weight factors, and DC offset values are added to the products. The resultant signals are then averaged to generate a prediction signal predD $$predD = \{w[0] \cdot ref[0] + w[1] \cdot ref[1] + (d[0] + d[1])\}/2 \qquad (26)$$

In this embodiment, a weight factor and DC offset value are determined for each reference frame in this manner.

A method of determining the above weight factors and DC offset values in an encoding operation according to this embodiment will be described with reference to FIG. 33. The method of determining weight factors and DC offset values will be described with reference to the flow chart of FIG. 33, assuming that the inter-frame prediction relationship shown in FIG. 34 is maintained, i.e., the frame F3 is a video frame, and the frames F0, F1, and F2 are reference frames.

Weight factors and DC offset values are regarded as independent values with respect to a plurality of reference frames, and weight factor/DC offset data table data is encoded for each video frame or slice. For example, with respect to the video frame F3 in FIG. 34, weight factors and DC offset values (w[0], d[0]), (w[1], d[1]), and (w[2], d[2]) corresponding to the frames F0, F1, and F2 are encoded. These values may be changed for each slice in the video frame.

First of all, an average value DCcur (a DC component intensity to be referred to as a DC component value hereinafter) of pixel values in the entire to-be-encoded frame F3 or in each slice in the frame is calculated as follows (step S10).

$$DCcur = \frac{\sum_{x,y} F3(x, y)}{N} \qquad (27)$$

where F3(x, y) is a pixel value at a coordinate position (x, y) in the frame F3, and N is the number of pixels in the frame or a slice. The AC component intensity (to be referred to as an AC component value hereinafter) of the entire video frame F3 or each slice in the frame is then calculated by the following equation (step S11):

$$ACcur = \frac{\sum_{x,y} |F3(x, y) - DCcur|}{N} \quad (28)$$

In measurement of an AC component value, a standard deviation like the one described below may be used. In this case, the computation amount in obtaining an AC component value increases.

$$ACcur = \sqrt{\frac{\sum_{x,y} (F3(x, y) - DCcur)^2}{N}} \quad (29)$$

As is obvious from a comparison between equations (28) and (29), the AC component value measuring method based on equation (28) is effective in reducing the computation amount in obtaining an AC component value.

Letting "ref_idx" be an index indicating a reference frame number, a DC component value DCref[ref_idx] of the (ref_idx)-th reference frame and an AC component value ACref[rf_idx] are calculated according to equations (27) and (28) (steps S13 and S14).

On the basis of the above calculation result, a DC offset value d[ref_idx] with respect to the (ref_idx)-th reference frame is determined as the difference between DC components as follows (step S15):

$$d[ref\_idx] = DCcur - DCref[ref\_idx] \quad (30)$$

A weight factor w[ref_idx] is determined as an AC gain (step S16).

$$w[ref\_idx] = ACcur/ACref[ref\_idx] \quad (31)$$

The above calculation is performed with respect to all the reference frames (from ref_idx=0 to MAX_REF_IDX) (steps S17 and S18). MAX_REF_IDX indicates the number of reference frames. When all weight factors and DC offset values are determined, they are encoded as table data for each video frame or slice, and weighted predictive encoding of the respective pixel blocks is performed in accordance with the encoded weight factors and DC offset values. Prediction pixel block signals in encoding and decoding operations are generated according to equations (24) to (26) described above.

Generating prediction signals by using weight factors and DC offset values which vary for each reference frame and performing predictive encoding in the above manner can properly generate prediction signals from a plurality of reference frames and realize high-prediction-efficiency encoding with higher efficiency and high picture quality even with respect to a video signal which varies in signal amplitude for each frame or slice over time or varies in DC offset value.

A specific example of the method of encoding information of weight factors and DC offset values will be described next. FIGS. 35, 36, and 37 show data structures associated with encoding of information of weight factors and DC offset values.

FIG. 35 shows part of the header data structure of a video frame to be encoded or slice. A maximum index count "number_of_max_ref_idx" indicating reference frames for the video frame or slice and a table data "weighting_table( )" indicating information of weight factors and DC offset values are encoded. The maximum index count "number_of_max_ref_idx" is equivalent to MAX_REF_IDX in FIG. 33.

FIG. 36 shows the first example of an encoded data structure concerning the weight factor/DC offset data table. In this case, the data of weight factors and DC offset values corresponding to each reference frame are encoded in accordance with the maximum index count "number_of_max_ref_idx" sent as the header data of the frame or slice. A DC offset value d[i] associated with the ith reference frame is directly encoded as an integral pixel value.

A weight factor w[i] associated with the ith reference frame is not generally encoded into an integer. For this reason, as indicated by equation (32), the weight factor w[i] is approximated with a rational number w'[i] whose denominator becomes a power of 2 so as to be encoded into a numerator [i] expressed in the form of an integer and a denominator to the power of 2 w_exponential_denominator.

$$w'[i] = \frac{w\_numerator[i]}{2^{w\_exponential\_denominator}} \quad (32)$$

The value of the numerator and the denominator to the power of 2 can be obtained by $$w\_numerator[i] = (int)w[i] \times 2^{w\_exponential\_denominator}$$

$$w\_exponential\_denominator = (int)\log_2\left(\frac{255}{\max_i(w[i])}\right) \quad (33)$$

In encoding and decoding operations, a prediction picture is generated by using the above encoded approximate value w'[i]. According to equations (32) and (33), the following merits can be obtained.

According to the weight factor expression based on equation (32), the denominator of the weight factor is constant for each video frame, whereas the numerator changes for each reference frame. This encoding method can reduce the data amount of weight factors to be encoded, decrease the encoding overhead, and improve the encoding efficiency as compared with the method of independently encoding weight factors for each reference frame into denominators and numerators.

If the denominator is set to a power of 2, since multiplications of weight factors with respect to reference pixel block signals can be realized by multiplications of integers and bit shifts, no floating-point operation or division is required. This makes it possible to reduce the hardware size and computation amount for encoding and decoding.

The above computations will be described in further detail below. Equation (34) represents a prediction expression obtained by generalizing the predictive expression indicated by equations (24) and (25) and is used for the generation of a prediction pixel block signal for a pixel block corresponding to a reference frame number i. Let Predi be a prediction signal, ref[i] be the reference pixel block signal extracted from the ith reference frame, and w[i] and d[i] are a weight factor and DC offset value for the reference pixel block extracted from the ith reference frame.

$$Pred_i = w[i] \cdot ref[i] + d[i] \quad (34)$$

Equation (35) is a prediction expression in a case wherein the weight factor w[i] in equation (34) is expressed by the rational number indicated by equation (32). In this case, wn[i] represents w_numerator[i] in equation (32), and wed represents w_exponential_denominator.

$$Pred_i=((wn[i]\cdot ref[i]+1<<(wed-1))>>wed)+d[i] \quad (35)$$

In general, since the weight factor w[i] which is effective for an arbitrary fading picture or the like is not an integer, a floating-point multiplication is required. In addition, if w[i] is expressed by an arbitrary rational number, an integer multiplication and division are required. If the denominator indicated by equation (32) is expressed by a rational number which is a power of 2, a weighted predictive computation can be done by an integer multiplication using an integral coefficient wn[i], adding of an offset in consideration of rounding off, a right bit shift of wed bit, and integral addition of a DC offset value, as indicated by equation (35). This eliminates the necessity for floating-point multiplication.

A power of 2 which indicates the magnitude of a denominator is commonly set for each video frame or slice regardless of a reference frame number i. Even if, therefore, the reference frame number i takes a plurality of values for each video frame, an increase in code amount in encoding weight factors can be suppressed.

Equation (36) indicates a case wherein the weight factor representation based on equation (32) is applied to a prediction based on the linear sum of two reference frames indicated by equation (32), as in the case with equation (35).

$$Pred=((wn[0]*ref[0]+wn[1]\cdot ref[1]+1<<wed)>>(wed+1))+(d[0]+d[1]+1)>>1 \quad (36)$$

In the above prediction based on the linear sum of two reference frames as well, since a weight factor is not generally encoded into an integer, two floating-point multiplications are required according to equation (26). According to equation (36), however, a prediction signal can be generated by the linear sum of two reference frames by performing only an integer multiplication, bit shift, and integer addition. In addition, since information wed concerning the magnitude of a denominator is also commonized, an increase in code amount in encoding a weight factor can be suppressed.

According to equation (36), the numerator of a weight factor is expressed by eight bits. If, therefore, a pixel signal value is expressed by eight bits, encoding and decoding can be done with a constant computation precision of 16 bits.

In addition, within the same video frame, a denominator, i.e., a shift amount, is constant regardless of reference frames. In encoding or decoding, therefore, even if reference frames are switched for each pixel block, there is no need to change the shift amount, thereby reducing the computation amount or hardware size.

If weight factors for all reference frames satisfy $$w\_numerator[i]=2^n\times K_i \quad (37)$$

the denominator and numerator of the to-be-encoded weight factor to be calculated by equation (36) may be transformed as follows:

$$w\_numerator[i]=w\_numerator[i]>>n$$

$$w\_exponential\_denominator=w\_exponential\_denominator-n \quad (38)$$

Equation (38) has the function of reducing each weight factor expressed by a rational number to an irreducible fraction. Encoding after such transformation can reduce the dynamic range of the encoded data of weight factors without decreasing the weight factor precision and can further reduce the code amount in encoding weight factors.

FIG. 37 shows the second example of the video data structure associated with a weight factor/DC offset data table. In the case shown in FIG. 37 a DC offset value is encoded in the same manner as in the form shown in FIG. 36. In encoding a weight factor, however, a power of 2 which indicates a denominator is not encoded unlike in the form shown in FIG. 36, and only the numerator of weight factor which is expressed by a rational number is encoded while the denominator is set as a constant value. In the form shown in FIG. 37, for example, a weight factor may be expressed by a rational number, and only a numerator w_numerator[i] may be encoded as follows.

$$w'[i]=\frac{w\_numerator[i]}{2^4} \quad (39)$$

$$w\_numerator[i]=\begin{cases} 1, & \text{if } w[i]\le \frac{1}{16} \\ 255, & \text{if } w[i]\ge 16 \\ (int)w[i]\times 2^4, & \text{else} \end{cases}$$

$$w\_exponential\_denominator=4 \quad (40)$$

In this embodiment, since the power of 2 which represents the denominator of the weight factor is constant, there is no need to encode information concerning the denominator to the power of 2 for each video frame, thereby further reducing the code amount in encoding a weight factor table.

Assume that in making a rational number representation with a constant numerator ("16" in the above case), the value of the numerator is clipped to eight bits. In this case, if, for example, a pixel signal is expressed by eight bits, encoding and decoding can be done with a constant computation precision of 16 bits.

In addition, in this embodiment, since the shift amount concerning a multiplication of a weight factor is constant, there is no need to load a shift amount for each frame in encoding and decoding. This makes it possible to reduce the implementation cost of an encoding or decoding apparatus or software or hardware size.

FIG. 38 schematically shows the overall time-series structure of to-be-encoded video data including the data structures shown in FIGS. 35 to 37. In the head of the video data to be encoded, information of a plurality of encoding parameters which remain constant within one encoding sequence, such as a picture size, is encoded as a sequence header (SH). Each picture frame or field is encoded as a picture, and each picture is sequentially encoded as a combination of a picture header (PH) and picture data (Picture data).

In the picture header (PH), a maximum index count "number_of_max_ref_idx" indicating reference frames and a weight factor/DC offset data table "weighting_table( )", which are shown in FIG. 35, are encoded as MRI and WT, respectively. In "weighting_table( )" (WT), a power of 2 w_exponential_denominator indicating the magnitude of the denominator common to the respective weight factors as shown in FIG. 36 is encoded as WED, and w_numerator[i] indicating the magnitude of the numerator of each weight factor and a DC offset value d[i] are encoded WN and D, respectively, following w_exponential_denominator.

With regard to combinations of weight factor numerators and DC offset values, a plurality combinations of WNs and Ds are encoded on the basis of the number indicated by "number_of_max_ref_idx" contained in the picture header. Each picture data is divided into one or a plurality of slices (SLCs), and the data are sequentially encoded for each slice.

In each slice, an encoding parameter associated with each pixel block in the slice is encoded as a slice header (SH), and one or a plurality of macroblock data (MB) are sequentially encoded following the slice header.

With regard to macroblock data, information concerning encoding of each pixel in the macroblock, e.g., prediction mode information (MBT) of a pixel block in the macroblock and motion vector information (MV), is encoded. Lastly, the encoded orthogonal transform coefficient (DCT) obtained by computing the orthogonal transform (e.g., a discrete cosine transform) of the to-be-encoded pixel signal or prediction error signal is contained in the macroblock data. In this case, both or one of ""number_of_max_ref_idx" and "weighting_table( )" (WT) contained in the picture header may be encoded within the slice header (SH).

In the arrangement of the weight factor table data shown in FIG. 37, since encoding of data indicating the magnitude of the denominator of a weight factor can be omitted, encoding of WED in FIG. 38 can be omitted.

FIG. 39 is a flow chart showing a video decoding procedure according to the embodiment of the present invention. A procedure for inputting the encoded data, which is encoded by the video encoding apparatus according to the embodiment described with reference to FIG. 33, and decoding the data will be described below.

The header data of an encoded frame or slice, which includes the weight factor/DC offset data table described with reference to FIGS. 35 to 37, is decoded from the input encoded data (step S30). The header data of an encoded block, which includes a reference frame index for identifying a reference frame for each encoded block, is decoded (step S31).

A reference pixel block signal is extracted from the reference frame indicated by the reference frame index for each pixel block (step S32). A weight factor and DC offset value are determined by referring to the decoded weight factor/DC offset data table on the basis of the reference frame index of the encoded block.

A prediction pixel block signal is generated from the reference pixel block signal by using the weight factor and DC offset value determined in this manner (step S33). The encoded prediction error signal is decoded, and the decoded prediction error signal is added to the prediction pixel block signal to generate a decoded picture (step S34).

When the respective encoded pixel blocks are sequentially decoded and all the pixel blocks in the encoded frame or slice are decoded, the next picture header or slide header is continuously decoded.

The encoding and decoding methods following the above procedures can generate proper prediction pictures in encoding and decoding operations even with respect to a vide signal which varies in signal amplitude over time or varies in DC offset value over time, thereby realizing high-efficiency, high-picture-quality video encoding and decoding with higher prediction efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video decoding method of performing a motion compensated prediction interframe decoding on an encoded video macroblock of an encoded video frame, using a plurality of reference frames and a motion vector between the encoded video macroblock and at least one of the reference frames, the method comprising:

decoding encoded data including a prediction error signal for the encoded video macroblock, a first index indicating the plurality of reference frames, a second index indicating the number of the encoded video frame, and the motion vector;

extracting a plurality of reference macroblocks from the plurality of reference frames according to the decoded motion vector and the decoded first index;

computing a distance between the plurality of reference frames and the encoded video frame according to the decoded second index;

computing a linear sum of the reference macroblocks, using weighting factors determined according to the calculated distance, to generate a predictive macroblock; and adding the predictive macroblock and the prediction error signal every encoded video macroblock to reconstruct a video picture.

2. A video decoding apparatus of performing a motion compensated prediction interframe decoding on an encoded video macro lock of an encoded video frame, using a plurality of reference frames and a motion vector between the encoded video macroblock and at least one of the reference frames, the apparatus comprising:

a decoder to decode encoded data including a prediction error signal for the encoded video macroblock, a first index indicating the plurality of reference frames, a second index indicating the number of the encoded video frame, and the motion vector;

an extractor to extract a plurality of reference macroblocks from the plurality of reference frames according to the decoded motion vector and the decoded first index;

a calculator to calculate a distance between the plurality of reference frames and the encoded video frame according to the decoded second index;

a calculator to calculate a linear sum of the reference macroblocks, using weighting factors determined according to the calculated distance, to generate a predictive macroblock; and an adder to add the predictive macroblock and the prediction error signal every encoded video macroblock to reconstruct a video picture.

* * * * *